United States Patent
Goden et al.

(10) Patent No.: US 6,923,723 B2
(45) Date of Patent: Aug. 2, 2005

(54) GAME DEVICE AND IMAGE PROCESSING DEVICE

(75) Inventors: Takeshi Goden, Tokyo (JP); Shigeyuki Iwase, Yokohama (JP); Kimio Tsuda, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 22 days.

(21) Appl. No.: 10/396,460

(22) Filed: Mar. 26, 2003

(65) Prior Publication Data

US 2003/0186740 A1 Oct. 2, 2003

Related U.S. Application Data

(63) Continuation of application No. 09/422,655, filed on Oct. 22, 1999, now abandoned.

(30) Foreign Application Priority Data

Oct. 23, 1998 (JP) .......................................... 10-320039

(51) Int. Cl.⁷ ................................................. A63F 9/21
(52) U.S. Cl. .............................. 463/36; 463/7; 463/23; 105/26.1; 105/88
(58) Field of Search ............................... 463/7, 23, 36; 434/247, 112; 104/62, 74, 83, 162; 105/26.1, 88; 345/161; 341/21

(56) References Cited

U.S. PATENT DOCUMENTS

| | | | | |
|---|---|---|---|---|
| 4,176,837 A | * | 12/1979 | Jeffrey et al. | 273/452 |
| 4,220,330 A | * | 9/1980 | Montgomery | 273/452 |
| 4,327,910 A | * | 5/1982 | Mackie | 273/452 |
| 4,714,244 A | * | 12/1987 | Kolomayets et al. | 482/72 |
| 4,984,986 A | * | 1/1991 | Vohnout | 434/247 |
| 5,683,082 A | * | 11/1997 | Takemoto et al. | 273/121 B |
| 6,095,920 A | * | 8/2000 | Sadahiro | 463/2 |
| 6,200,138 B1 | * | 3/2001 | Ando et al. | 434/61 |
| 6,220,865 B1 | * | 4/2001 | Macri et al. | 434/247 |
| 6,611,139 B1 | * | 8/2003 | Jackson | 324/207.2 |

OTHER PUBLICATIONS

Examiner's Declaration Regarding Commander Keen.*

Diablo Review, RPG, http;//www.cdmag.com/articles/002/055/diablo_review.html, 1997.*

* cited by examiner

*Primary Examiner*—Derris H. Banks
*Assistant Examiner*—Corbett Coburn
(74) *Attorney, Agent, or Firm*—Finnegan, Henderson, Farabow, Garrett & Dunner, L.L.P.

(57) ABSTRACT

To provide an image processing device, image processing method, and data processing method for a game device providing novel game features. In a multiple-player game device 1 comprising mutually coupled input mechanisms 31, it is possible for a game to be played by fewer people than the aforementioned number of players, by using a portion of the input mechanisms 31, the coupling of the input mechanisms other than the input mechanisms used by the fewer number of players being disengaged in cases where a game is played by a fewer number of players.

19 Claims, 20 Drawing Sheets

[Fig. 1]
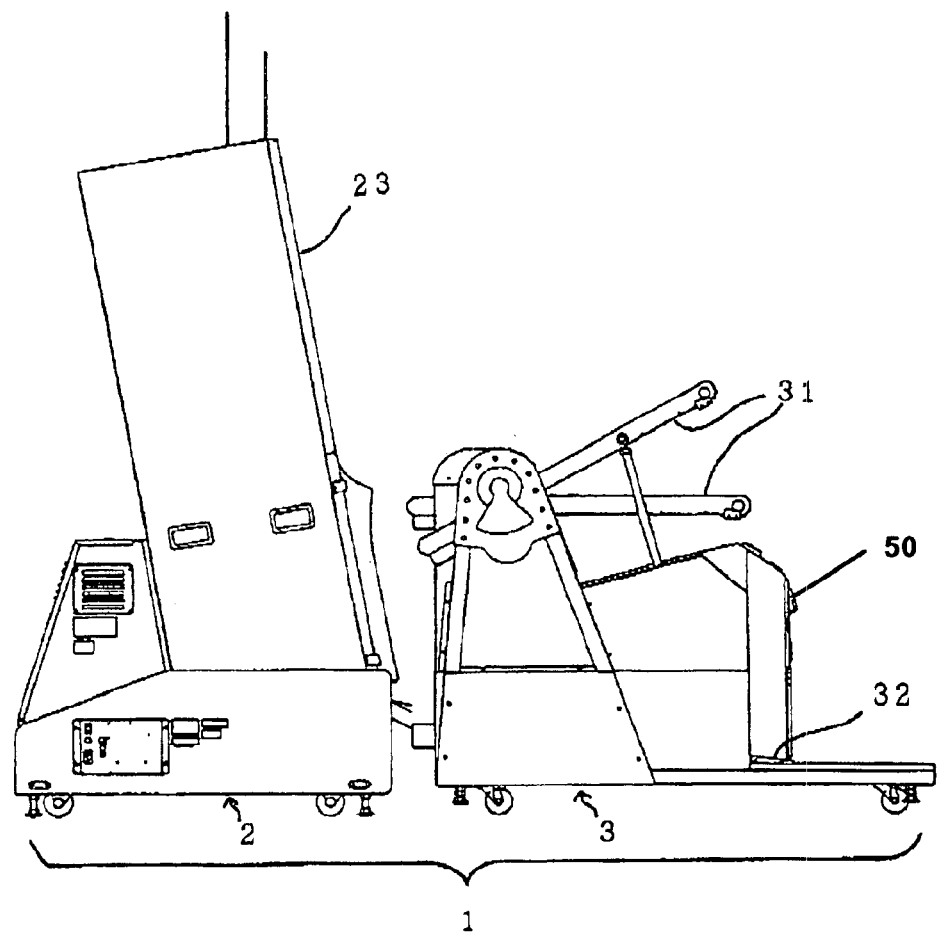

[Fig. 2]
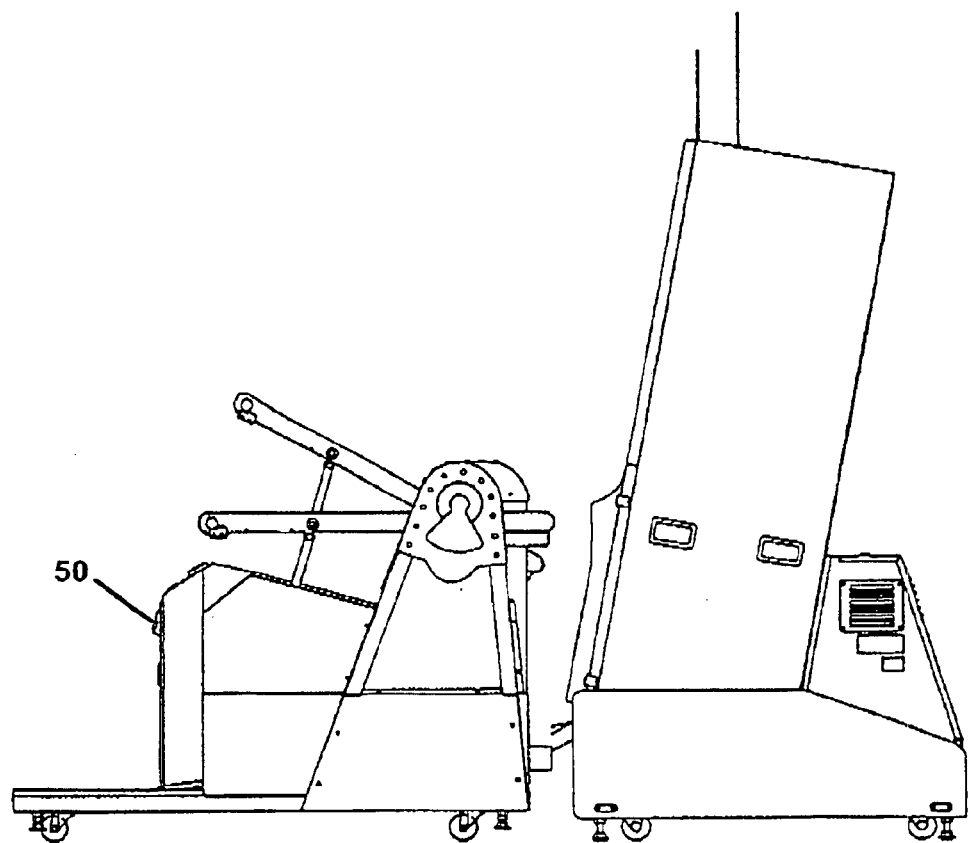

[Fig. 3]
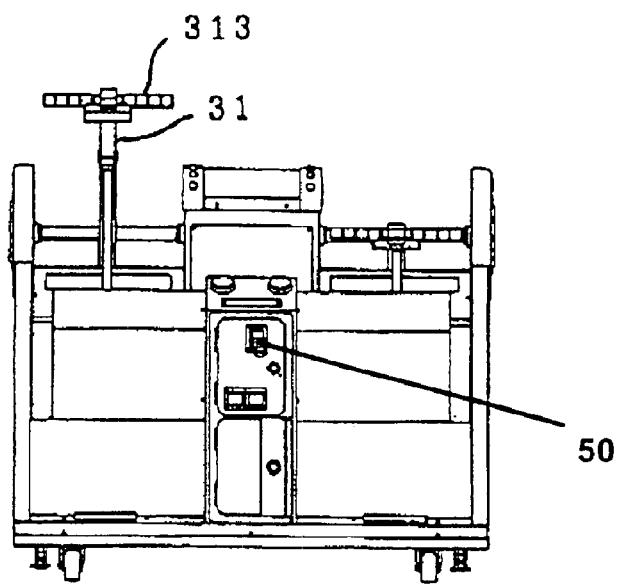
[Fig. 4]
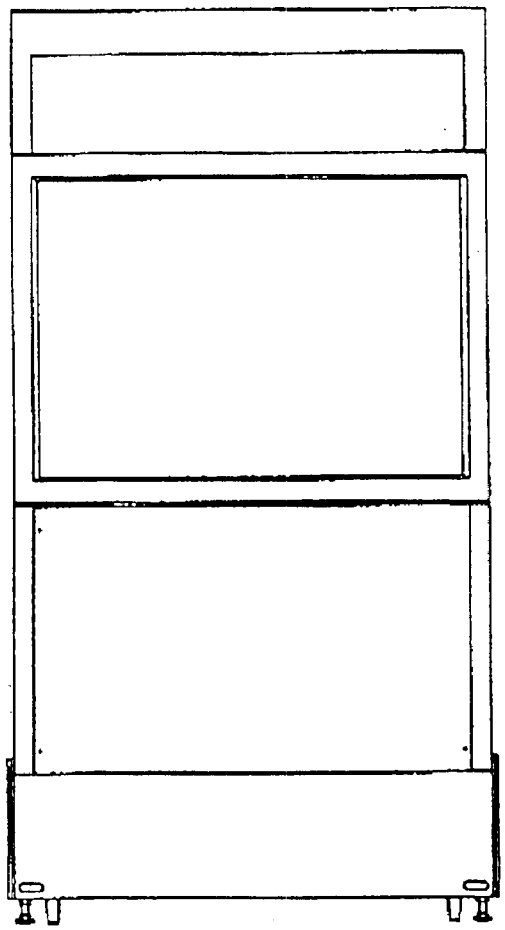

[Fig. 5]
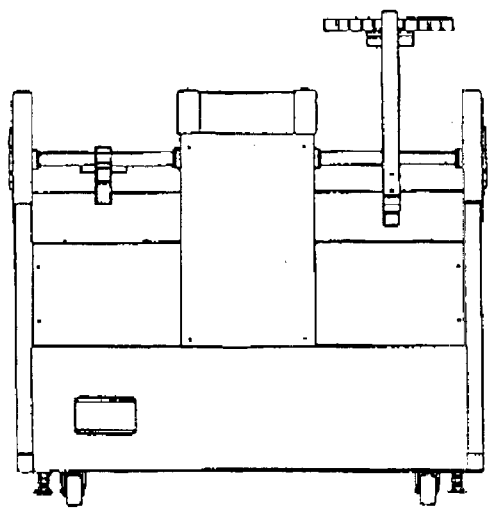
[Fig. 6]
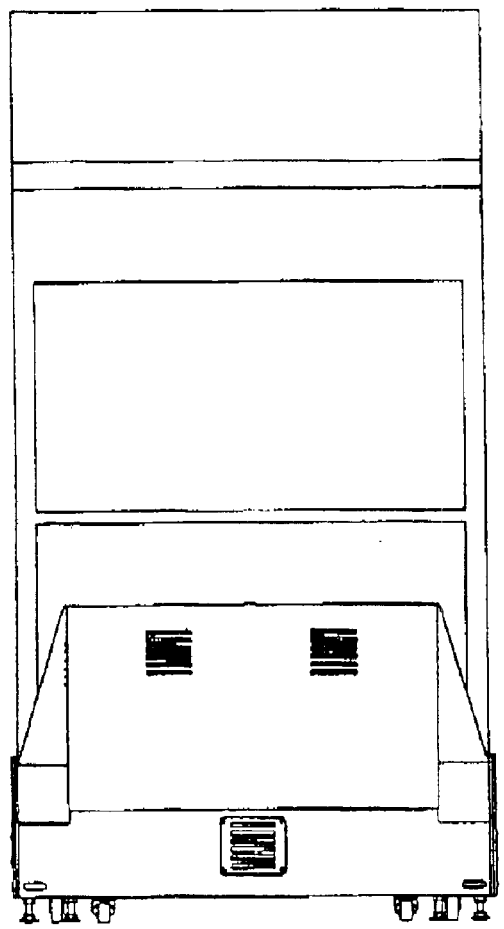

[Fig. 7]
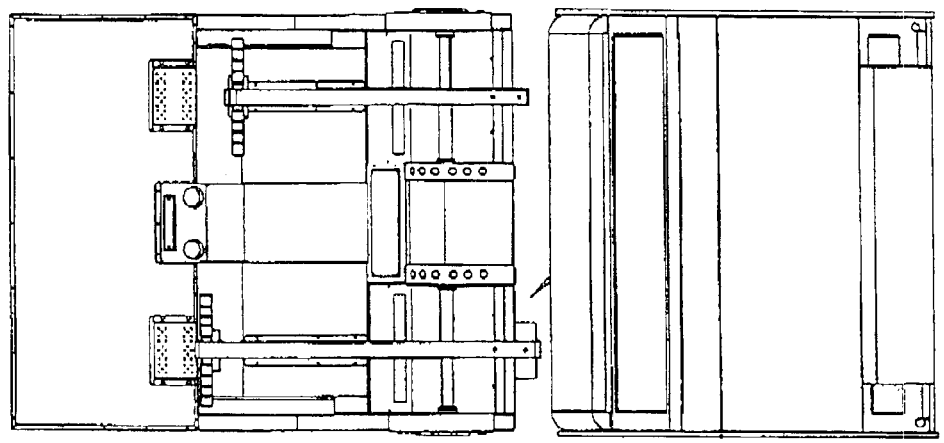
[Fig. 8]
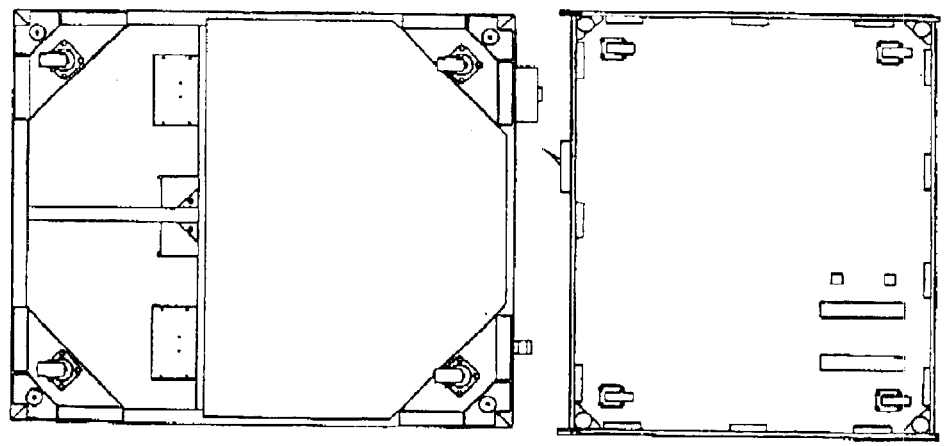

[Fig. 9]
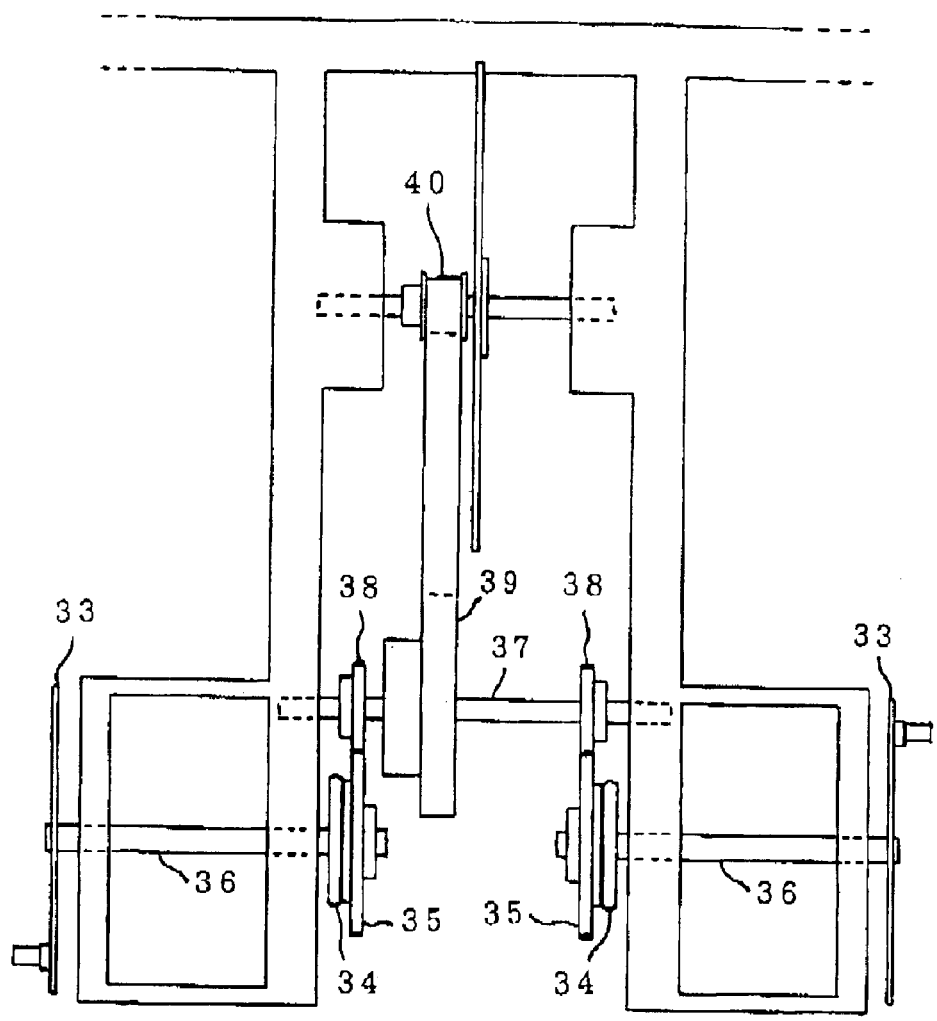

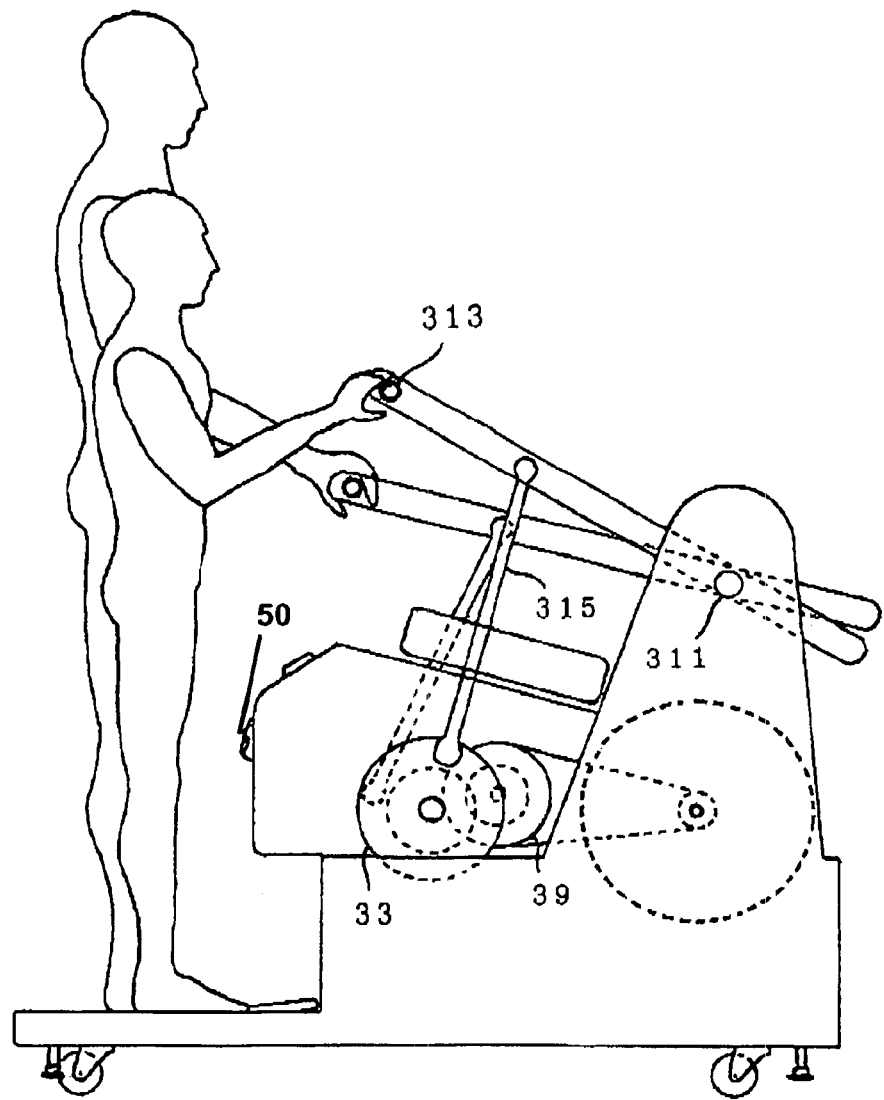
[Fig. 10]

[Fig. 11]
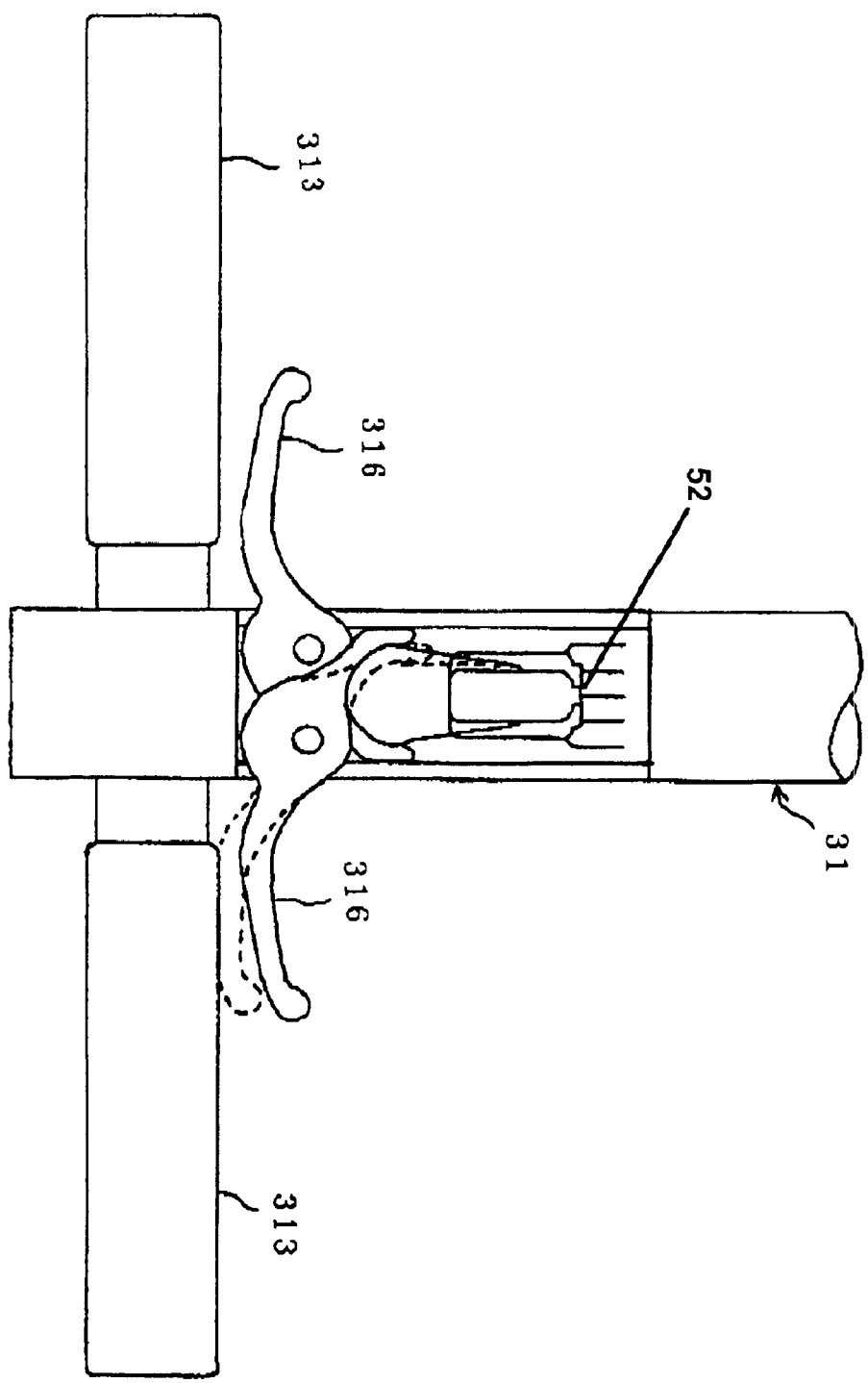

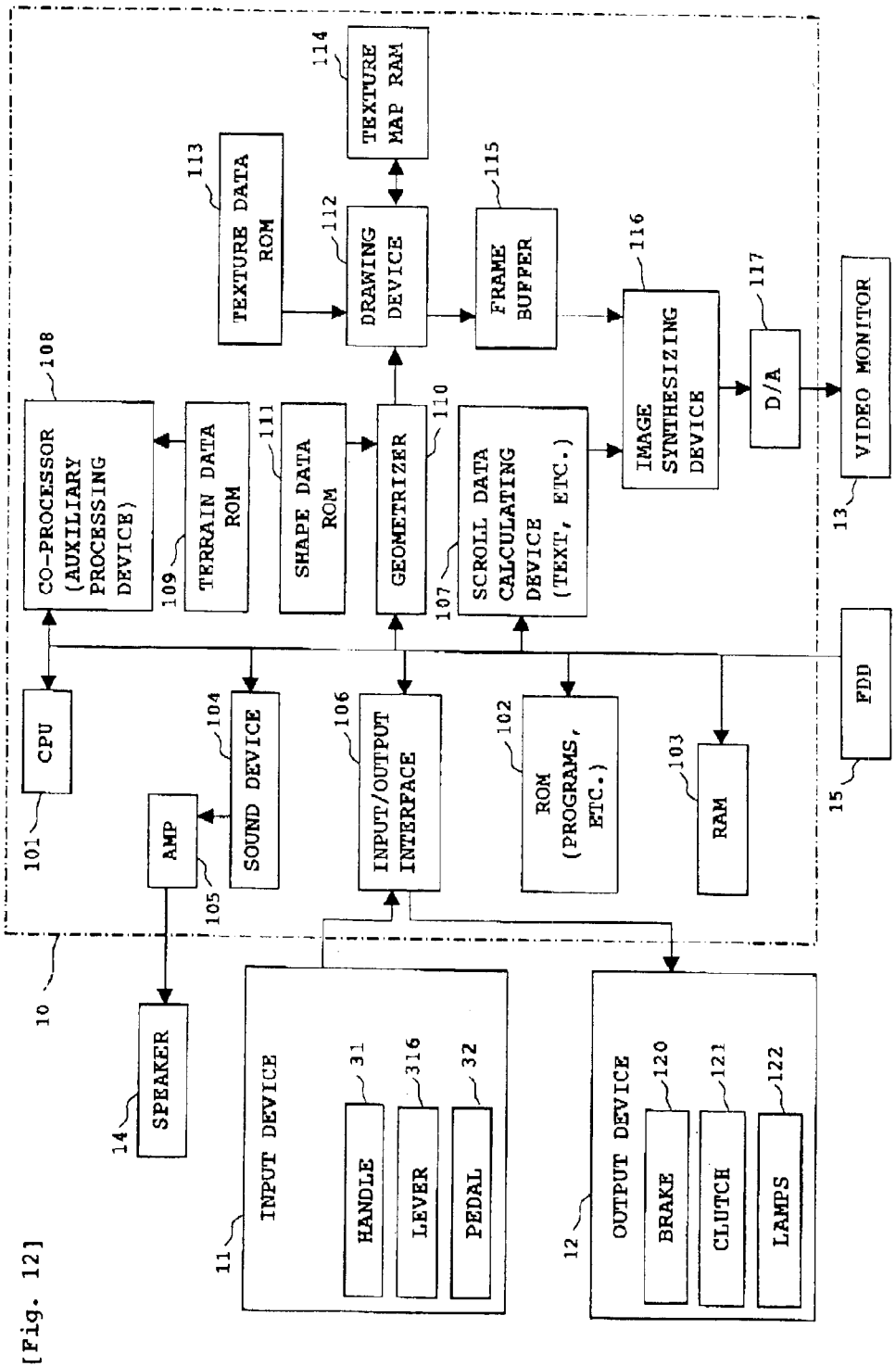
[Fig. 12]

[Fig. 13]
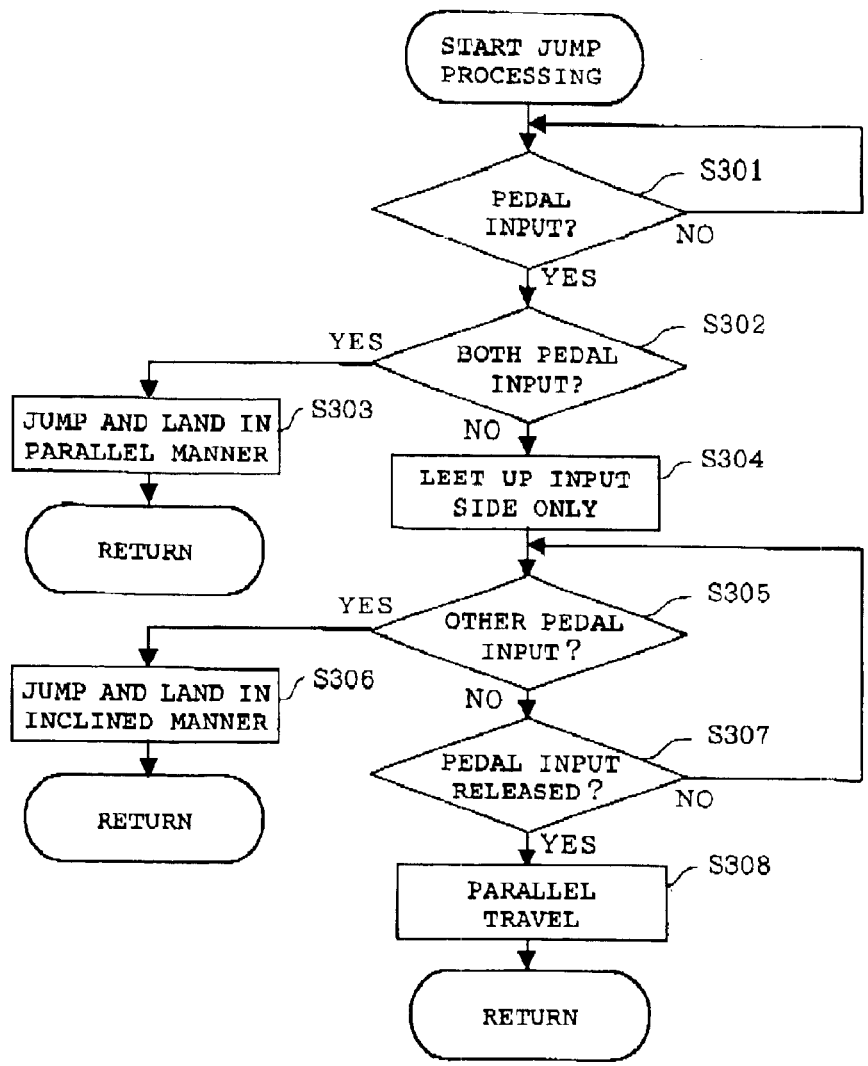

[Fig. 20]
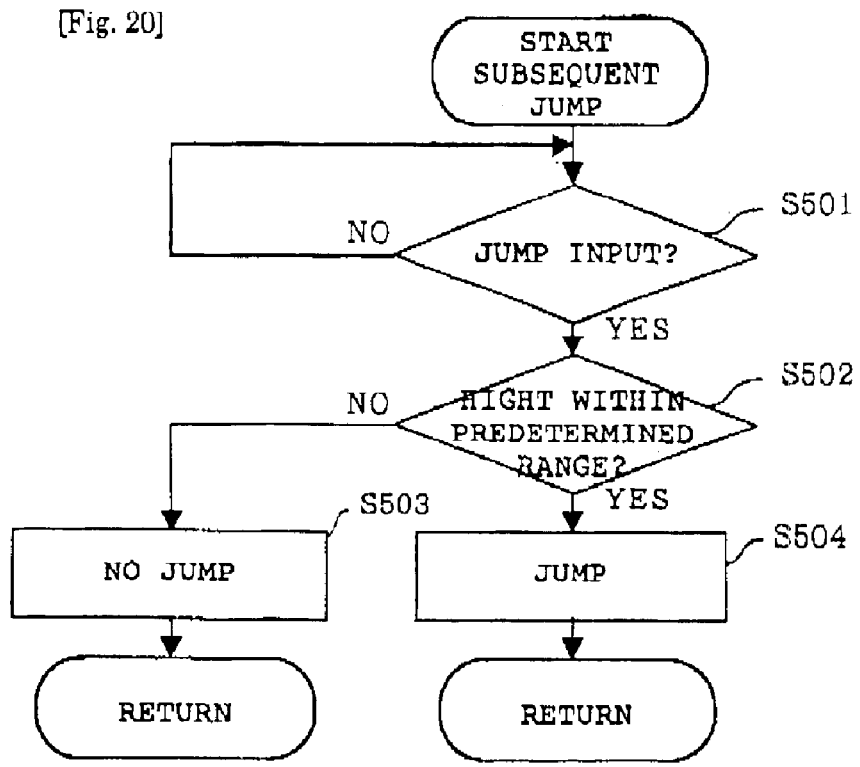
[Fig. 21]
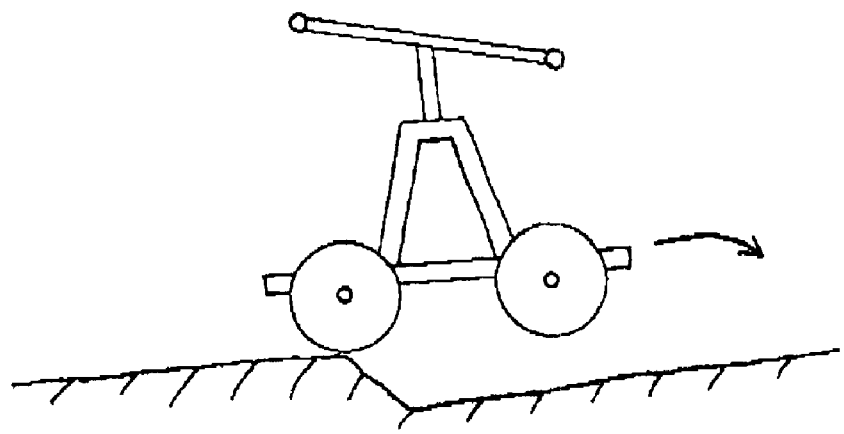

[Fig. 22]
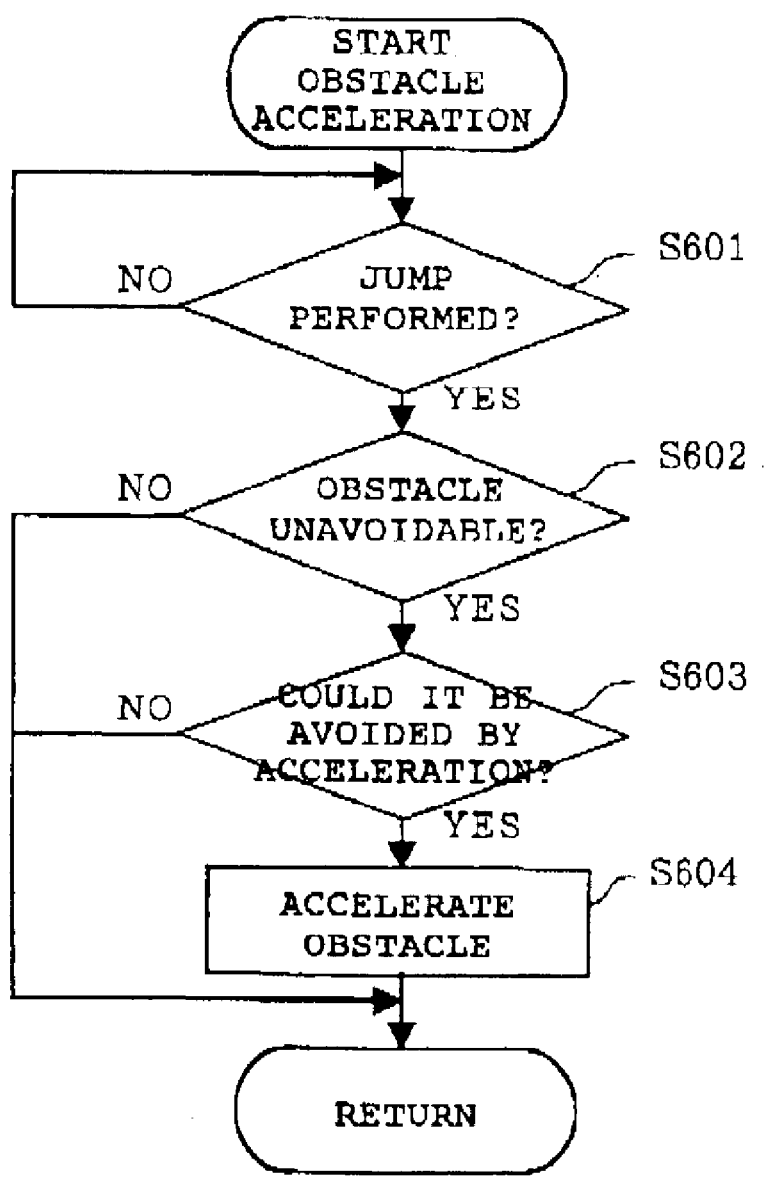

[Fig. 23]
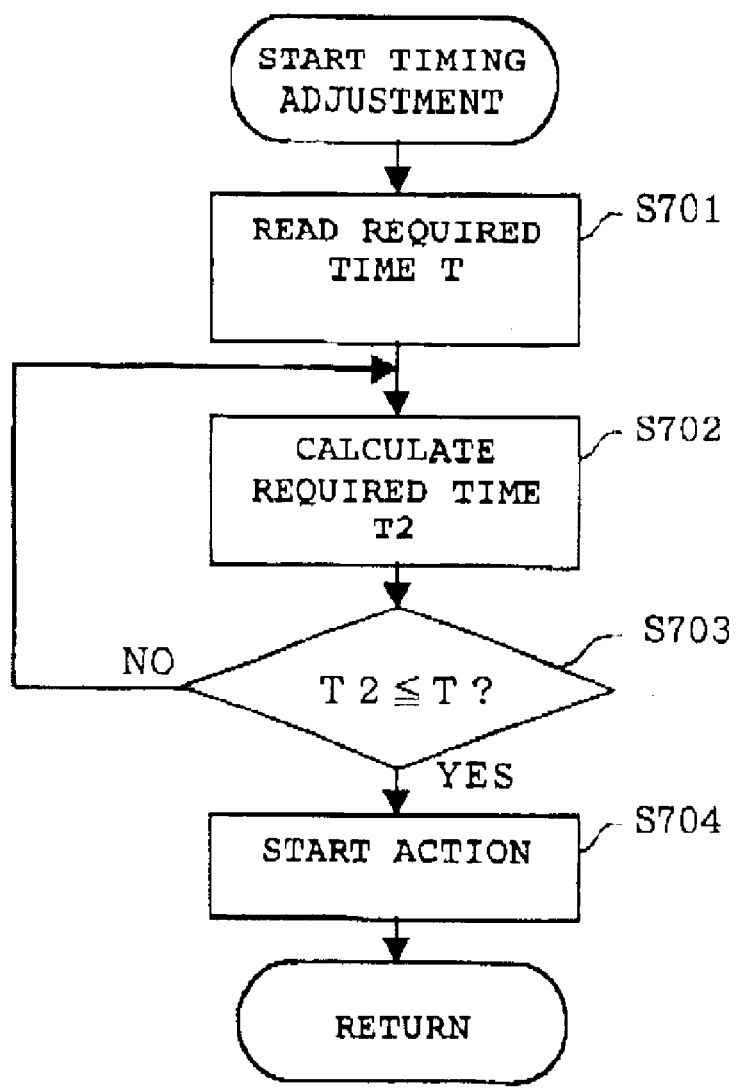

[Fig. 24]
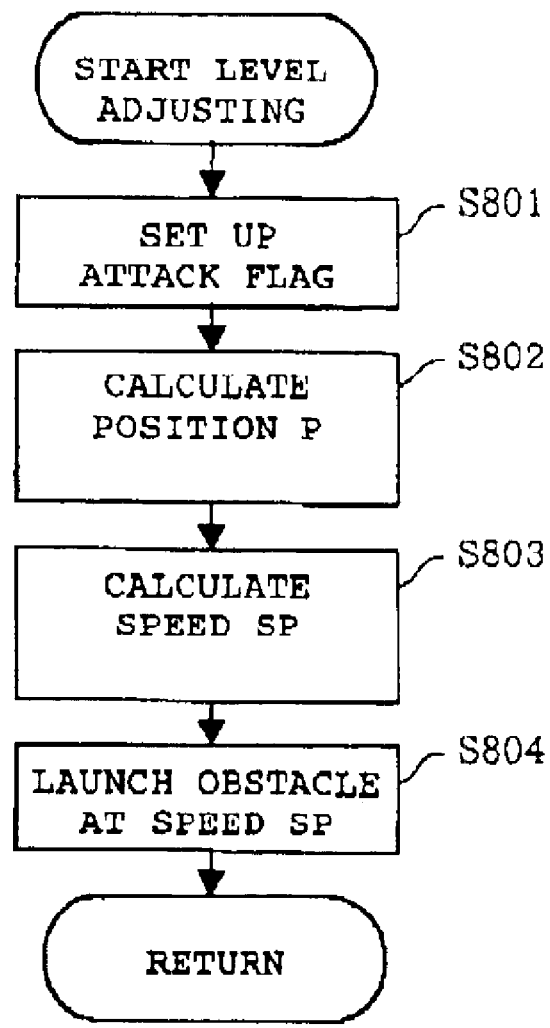

[Fig. 25]
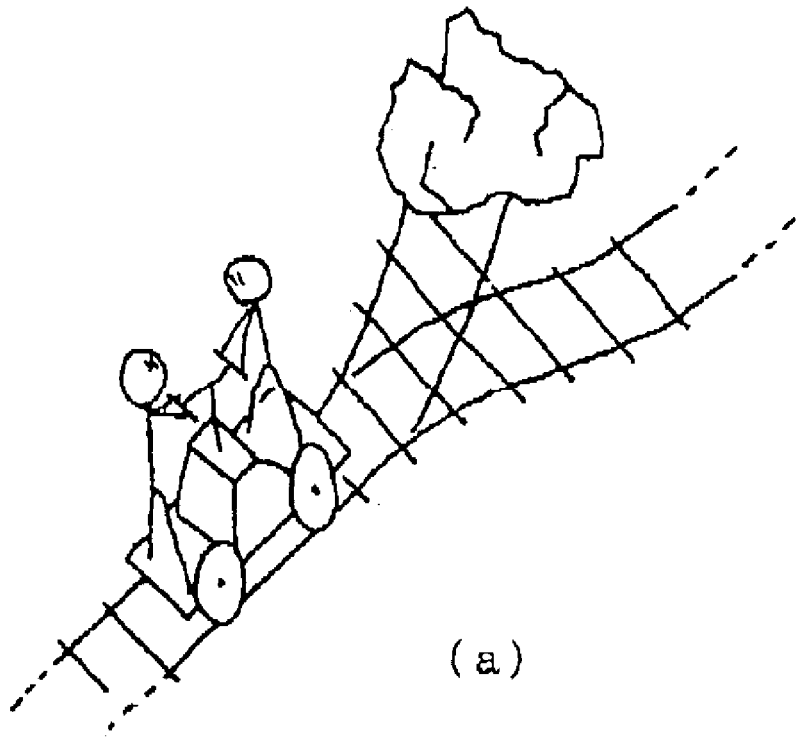
(a)
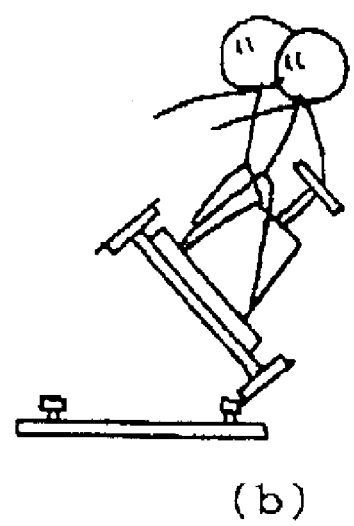
(b)

[Fig. 26]
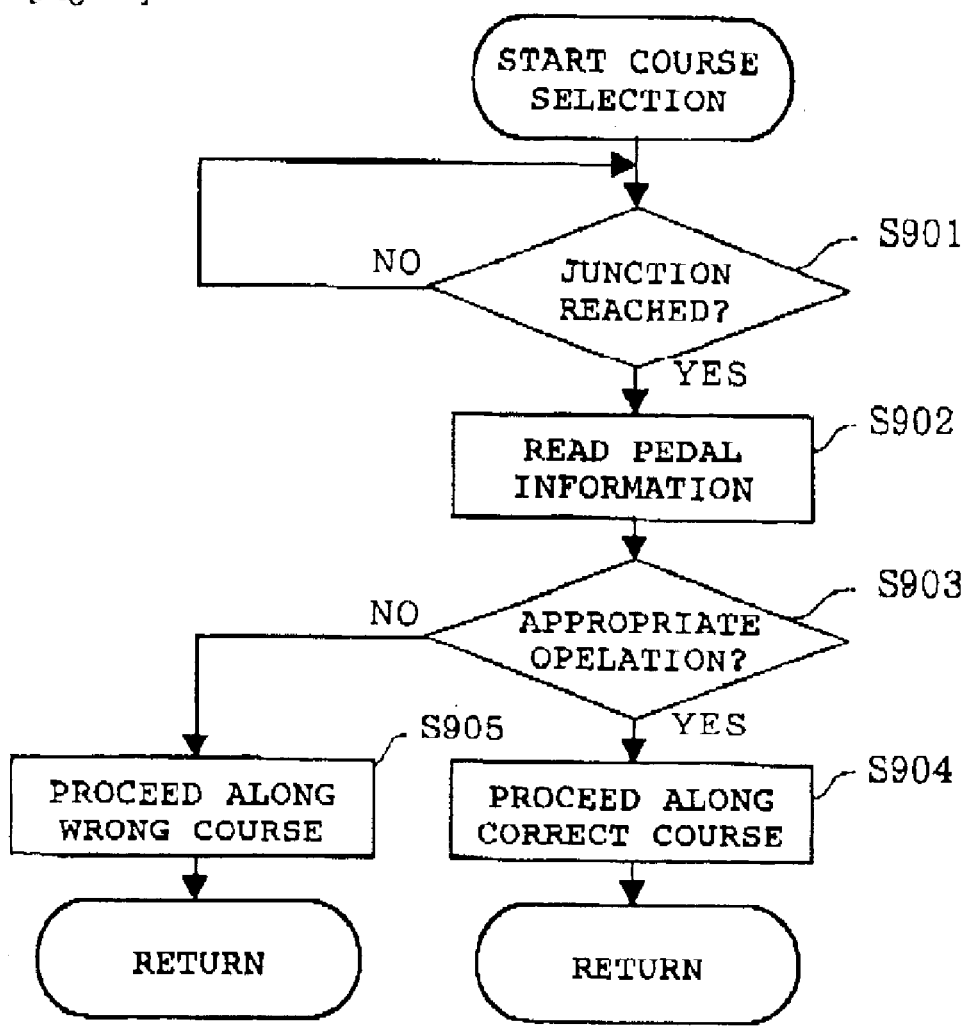

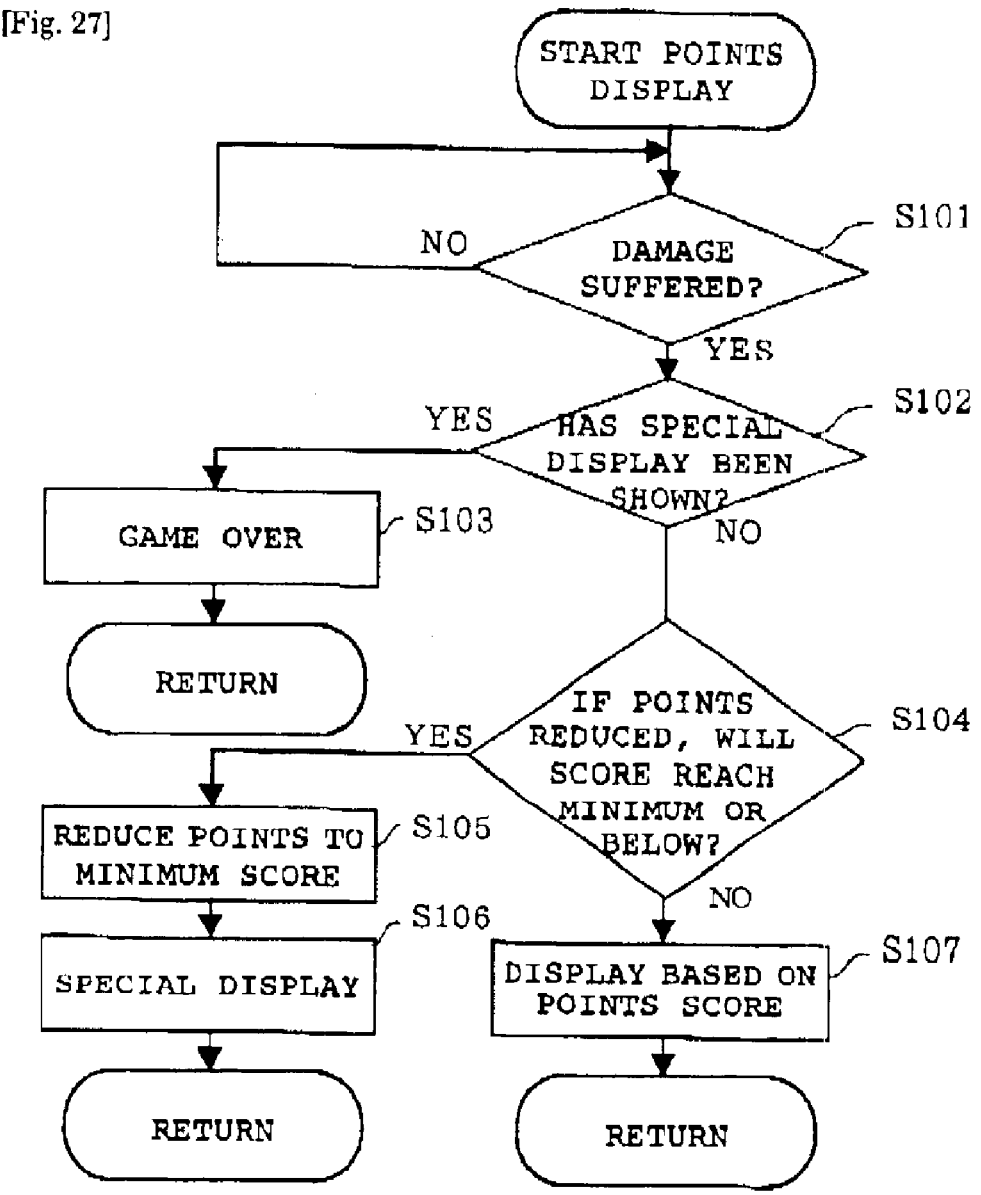
[Fig. 27]

GAME DEVICE AND IMAGE PROCESSING DEVICE

RELATED APPLICATION

The present application is a continuation of and claims benefit to U.S. patent application Ser. No. 09/422,655 filed Oct. 22, 1999.

BACKGROUND OF THE INVENTION

1. Field of the Invention

The present invention relates to a game device and an image processing device.

2. Description of the Related Art (1) Firstly, in the prior art, two-person game devices having input mechanisms for two people, whereby two players aim to score points in a co-operative or competitive fashion are known. A game device of this kind is designed such that it can be used as a one-person game device in cases where there is only one player.

However, in multiple-person game devices of this kind, which are designed in such a manner that the respective input devices are mutually coupled, if the device is used, for example, as a one-person game device, then the input device which is not being used by the player will also move. There are no conventional game devices which take account of the danger of the fact that the input device not being used by the player is coupled to the input device that is being used by the player.

(2) Secondly, conventionally, there exist devices wherein two operating means which are mutually coupled are operated respectively by two people positioned facing each other. When making a game device based on this model, it is necessary to provide display means for displaying the state of operation of the device.

However, if a game device is designed in such a manner that it is operated by two players positioned facing each other, as described above, then it is necessary to provide two display means if display means are to be provided in front of the players so that they can be viewed easily by the players. Moreover, if it is attempted to manage with one display means only, then it is necessary to provide the display means at a position other than one in front of the players, therefore making it more difficult for the players to see the display means.

Moreover, when making a game device based on this model, if an input mechanism is provided which comprises an operating section operated by a player, at one end thereof, and an support section which is axially supported such that it can reciprocally with respect to the main body of the device, at the other end thereof, and if this input mechanism is located in a position corresponding to the physical characteristics of the player, then the display area of the display means may be concealed by the support section of the input mechanism, if the position of the display area is not also raised accordingly. On the other hand, if the position of the display area is made too high, a problem arises in that the device as a whole becomes too large and moreover, the player will have to look upwards at the display means, and hence it becomes more difficult for the player to see the display area.

(3) Thirdly, conventionally, there is also known a two-person game device which comprises a pair of input mechanisms operated respectively by two players, whereby the two players aim to score points in a co-operative fashion. In a game device of this type, the input from one player is independent of the input from the other player, and hence each player is able to make his or her desired input regardless of the input made by the other player.

However, in a conventional two-person game device, the respective points capability of each of the two players as individuals has a large influence on the points score achieved when two people play a game, whilst the degree of co-operation or teamwork between the two players has little influence on the points score.

(4) Fourthly, conventionally, there is also known an image processing device whereby images of a three-dimensional model viewed from a specified viewpoint are displayed as a two-dimensional projection. In an image processing device of this kind, a sense of three-dimensionality can be applied to the image by creating object shadows, and the positional relationship between two objects can be conveyed to a viewer by forming the shadow of one object on another object. However, in some cases, depending on the position in which the shadow is formed, the shadow may conceal the object, for example, or it may be formed outside the display area of the screen, thereby making it impossible to depict a sense of three-dimensionality.

(5) Fifthly, in the field of game devices, there exist devices wherein images modeled on certain objects are displayed on display means, and the players play a game by performing various operations with respect to these objects. If the objects comprise, for example, a land surface and a moving object, then it is sometimes necessary, in terms of the characteristics of the objects, for certain conditions to be satisfied for an input to be made, for instance, the moving object is not able to leap through the air for a second time unless it has first landed on the land surface. However, in some cases, in a game device provided with an image processing device displaying images, wherein objects in a virtual three-dimensional space are viewed from a specified viewpoint, on display means, it may be difficult to comprehend the precise positional relationship between objects.

Therefore, if a player thinks that the moving object has landed and makes an input for causing the moving object to jump, but the moving object has not in fact landed yet, then the game device will not accept the input. Consequently, since the input made by the player is not accepted by the device, the player will feel increased stress during the game, causing his or her enjoyment of the game to diminish.

(6) Sixthly, there exist game devices wherein the game content includes the action of having to avoid contact between obstacles and the object controlled by the player. In a game device of this kind, in some cases, obstacles moving over the land surface are avoided by, for example, causing the object to jump above the land surface. Here, since the amount of time the object remains in the air after jumping is limited, the amount of time for which it is able to avoid an obstacle is also limited. Therefore, if the obstacles become large in size, or the relative speed between the obstacles and the object controlled by the player becomes low, it may become impossible to avoid obstacles, even if the player causes the object to jump at optimum timing.

(7) Seventhly, in an image processing device, in some cases, an object moving through a virtual space must be displayed on the display means in such a manner that a second action in a series of actions including a first action and a second action is performed when the object is in a specified position. In this case, the period of time taken for the object to reach the aforementioned specified position from the current position thereof varies depending on the speed at which the object is moving, and the like. Therefore, it can be seen that if the speed of the object is high, the time period from starting the first action until the second action is performed is shortened, whilst if the speed of the object is low, then the object can be caused to perform the second action at the specified position by slowing down the action of the object.

However, there is a risk that if the time period from the object starting the first action until it performs the second action increases or decreases, then an unnatural image will result. On the other hand, if the action is performed at a uniform time period, then the position at which the object should start the first action will vary depending on the speed of the object, and the like, and hence it cannot be defined in a universal manner.

(8) Eighthly, in an image processing device applied in a fighting game, chase game, or the like, in some cases, a third object (such as an obstacle, missile, or the like) is thrown or fired by a first object (enemy character) at a second object (player's character). In this case, the time period taken for the third object to reach the second object after it has been fired from the first object varies depending on the speed of the third object, the speed of the second object, and the distance between the first object and second object.

However, the time period taken for the third object to reach the second object after being fired from the first object greatly affects the level of difficulty of the game, and by changing this time period, it is possible to make the game more easy or more difficult than necessary. Here, if the speed of the second object and the distance between the first object and the second object are adjusted in order to match this time period to the level of difficulty of the game, then the image will become unnatural.

(9) Ninthly, there exist game devices having a game content which involves the player selecting one of a specified set of choices. For example, in a vehicle-based game, junction points may be provided on a course and the player is made to select one or other course. This game device is programmed in such a manner that if the player selects the correct course, then this has a beneficial result, and if the player selects the wrong course, then this has a disadvantageous result.

Here, a method may be used whereby, if the player has not made a selecting operation, then the vehicle is caused to veer off the course, for example. Moreover, if the player does not enter a valid operation for the selecting operation, then a scene may be depicted where, for instance, the vehicle crashes into an obstacle provided between the branches of the course.

However, if a scene of this kind is created, then a control program for same and further programs and data for depicting the destruction of the vehicle will be required, hence increasing the operational load on the game device, as well as taking up memory in the game device and increasing the information processing load in the game.

(10) Tenthly, some game devices are provided with means for displaying points, and when a specified points deduction event occurs, a number of points corresponding to that event is deducted, and if the remaining points total reaches zero, the game is ended. However, if a major points deduction event occurs during a game, for example, then a situation may arise where a number of points that is larger than the remaining points total is deducted in one step, thereby causing the game to end suddenly, even though the player thought that he or she had sufficient points remaining. This type of situation may cause distrust or stress in the player with respect to the game.

In particular, if the loss of points is depicted by pictorial change rather than by a gauge, then in many cases it may be difficult for the player to comprehend accurately the remaining points total in the game and the points reductions corresponding to individual points deduction events. Consequently, the player may experience distrust or stress if the game ends suddenly.

SUMMARY OF THE INVENTION

It is an object of the present invention to provide a game device comprising novel approaches relating to game playability, and to an image processing device, image processing method, data processing method and medium relating to same. More particularly, the objects of the present invention are listed in the paragraphs below.

(1) A first object of the present invention is to provide a game device for multiple players which gives a high level of safety in cases where a game device designed in such a manner that respective input devices are mutually coupled is used by fewer people than the aforementioned number of multiple players.

(2) A second object of the present invention is to provide a game device modeled on a machine wherein two mutually coupled operating means are operated respectively by two players facing the operating means, or a game device comprising input mechanisms having operating sections operated by a player, at one end thereof, and support sections supported axially with respect to the main body of the device, at the other end thereof, and display means on which the game contents are displayed, wherein the display means formed by a screen is readily visible by the players.

(3) It is a third object of the present invention to provide a game device incorporating new game characteristics, whereby the degree of co-operation or teamwork displayed by two players can be reflected in their points score.

(4) It is a fourth object of the present invention to provide an image processing device whereby screen images of objects can be displayed on display means in such a manner that the positional relationship between two objects is readily comprehensible.

It is a further object of the present invention to provide an image processing device which is capable of altering the positions of shadows accordingly, when the positional relationship between two objects and the viewpoint has changed.

(5) It is a fifth object of the present invention to provide a game device whereby, even if an input is made when the input conditions for a specified operation are not satisfied, the input can be accepted, within a specified range of error, in such a manner that the player does not experience stress during the game.

(6) It is a sixth object of the invention to provide a game device whereby obstacles can be avoided, or such avoidance can be made easier, by increasing the relative speed between an obstacle and an object controlled by a player, in certain situations.

(7) It is a seventh object of the invention to provide an image processing device which is capable of initiating a specified sequence of operations at a correct timing, regardless of the state of the game, such as the positional relationship, relative speed, and the like, of a first object and a second object.

(8) It is an eighth object of the present invention to provide an image processing device or game device whereby a body fired from a first object towards a second object is displayed in such a manner that it reaches the second object after a fixed time period, even if the distance between the first object and second object and the speed of the second object are not uniform.

(9) It is a ninth object of the present invention to provide a game device whereby the load on the memory device and processing device can be reduced, by means of a simple design.

(10) It is a tenth object of the present invention to provide a game device whereby the player can be informed reliably that the game is about to end imminently, thereby reducing the stress on the player.

In order to achieve the aforementioned objects, consistent with the present invention there is provided a multiple-player game device having input mechanisms which are operated by a plurality of people and are mutually coupled, wherein a game can be played by a smaller number of people than the plurality of people, by using a portion of the input mechanisms, and when a game is played by the smaller number of people, the coupling to input mechanisms other than the input mechanisms used by the smaller number of players is disengaged.

Also consistent with the present invention, the input mechanisms other than the input mechanisms used by the smaller number of players are fixed, when a game is played by the smaller number of people.

Also consistent with the present invention, there is provided a game device modeled on a mechanism wherein two mutually coupled operating means are operated respectively by two people positioned facing to the means, comprising one display means for displaying images relating to the operation of these mechanisms, and two operating means which can be operated by two players located in positions whereby they are facing in the same direction towards the display means.

Also consistent with the present invention there is provided a game device comprising input mechanisms having an operating section operated by a player, at one end thereof, and a support section supported axially with respect to the main body of the device, at the other end thereof, and display means displaying the contents of a game, the display means being provided in a position on the support section side as viewed from the operating sections of the input mechanisms, such that it faces towards the operating section side, wherein the operating sections of the input mechanisms perform a reciprocal movement about a central position higher than the support sections, and the display screen of the display means is inclined in a gravitational direction.

Also consistent with the present invention there is provided a multiple-player game device, comprising input mechanisms operated respectively by a plurality of players, wherein the input mechanisms comprises means whereby a single input result is generated by a combination of operations performed by the plurality of players.

Also consistent with the present invention there is provided a multiple-player game device comprising judging means for judging a combination of operations performed by a plurality of players via input mechanisms, and processing means for implementing a single game processing sequence on the basis of this combination of operations.

Also consistent with the present invention there is provided a data processing method for a game device, comprising a judging step for judging a combination of operations performed by a plurality of people via input mechanisms, and a processing step for implementing a single processing sequence on the basis of this combination of operations.

Also consistent with the present invention there is provided an image processing device for implementing processing whereby images of a first object and a second object in a virtual three-dimensional space as viewed from a specified viewpoint are displayed on display means, comprising: shadow forming means for forming a shadow of the first object on the surface of the second object, within a specified range whereby an observer is able to perceive the positional relationship between the first and second objects; and shadow changing means for restoring the shadow to a position within the specified range, when the position of the shadow has moved outside the specified range.

Also consistent with the present invention, the shadow forming means sets a light source in the virtual three-dimensional space in such a manner that a shadow is formed within the specified range, and, in cases where the position of the shadow has moved beyond the specified range, due to the fact that the position of the light source has changed with respect to the first object, second object and viewpoint, the shadow changing means causes the light source to move inside the range by moving the light source further in the direction that it has moved.

Also consistent with the present invention, the specified range is in a position in an approximate sideways direction, as observed from the viewpoint, from a vertical line linking the first object to the plane of the second object.

Also consistent with the present invention, the specified range is in a position between 45 degrees to the front right and 45 degrees to the rear right, or 45 degrees to the rear left and 45 degrees to the front left, as observed from the viewpoint, from a vertical line linking the first object to the plane of the second object. Also consistent with the present invention, the plane on the second object is a broad flat plane simulating a land surface, and a scene is depicted wherein the first object jumps and falls from the vicinity of the plane of the second object onto the plane in an approximately perpendicular direction.

Also consistent with the present invention there is provided an image processing method for displaying, on display means, images depicting a first object and a second object in a virtual three-dimensional space as viewed from a specified viewpoint, comprising a shadow forming step for forming a shadow of the first object within a specified range on the surface of the second object whereby the positional relationship between the first and second objects can be perceived; and a shadow changing step for restoring the shadow to a position within the specified range, when the position of the shadow has moved outside the specified range.

Also consistent with the present invention there is provided a game device comprising image processing means whereby a first object simulating a first physical body and a second object simulating a second physical body are provided in a virtual three-dimensional space, and an image of same as observed from a specified viewpoint is displayed on display means, wherein it is a condition for a certain input that the positional relationship between the first physical body and the second physical body is in a specified state, with regard to the characteristics of the physical bodies, and when an operation for the aforementioned input is made, that input is accepted also in cases where the positional relationship differs from the specified state within a certain range thereof.

Also consistent with the present invention, the first object is a land surface, the specified viewpoint is set in a position higher than the land surface, and the specified state of the positional relationship is a state where the second object is in contact with the land surface.

Also consistent with the present invention there is provided a data processing method for a game device whereby a first object simulating a first physical body and a second object simulating a second physical body are provided in a virtual three-dimensional space, and an image of same as observed from a specified viewpoint is displayed on display means, wherein it is a condition for a certain input that the positional relationship between the first physical body and the second physical body is in a specified state, with regard to the characteristics of the physical bodies, and when an operation for the aforementioned input is made, that input is accepted also in cases where the positional relationship differs from the specified state within a certain range thereof.

Also consistent with the present invention there is provided a game device comprising game contents whereby a first object is withdrawn for a fixed period of time by an operation implemented by the player, in such a manner that the first object does not contact a second object, wherein the relative speed between the first object and second object is increased in specified cases, whilst the first object is withdrawn.

Also consistent with the present invention, the specified cases are cases where contact between the first object and the second object cannot be avoided unless the relative speed is increased.

Also consistent with the present invention, the specified cases are cases where the first object and the second object are travelling the same direction, or cases where the second object is larger than a further second object in the game.

Also consistent with the present invention, the relative speed is increased only in cases where the input for making the withdrawal operation is performed at a suitable timing.

Also consistent with the present invention there is provided a data processing method for a game device, comprising: an input receiving step for receiving a withdrawal input whereby a first object is withdrawn for a fixed period of time in such a manner that the first object does not contact a second object; and an accelerating step for increasing the relative speed between the first object and the second object in specified cases, whilst the first object is withdrawn.

Also consistent with the present invention there is provided an image processing device whereby a first action, and a second action carried out when a first object and a second object are in a specified positional relationship, are displayed on display means, the first action being started in such a manner that the second action is started after a fixed time period from the start of the first action.

Also consistent with the present invention there is provided an image processing device whereby a first action, and a second action carried out when a first object and a second object are in a specified positional relationship, are displayed on display means, comprising: setting means for setting the required time period from the start of the first action until the second action is performed; time period calculating means for calculating the period of time taken for the first object and the second object to assume the specified positional relationship, on the basis of the relative speed between the first object and the second object, and the distance between the first object and the second object; judging means for judging whether or not this time period is equal to the aforementioned required time period; and action initiating means for initiating the first action on the basis of the result from the judging means.

Also consistent with the present invention there is provided an image processing method whereby a first action, and a second action carried out when a first object and a second object are in a specified positional relationship, are displayed on display means, comprising: a setting step for setting the required time period from the start of the first action until the second action is performed; a time period calculating step for calculating the period of time taken for the first object and the second object to assume the specified positional relationship, on the basis of the relative speed between the first object and the second object, and the distance between the first object and the second object; a judging step for judging whether or not this time period is equal to the aforementioned required time period; and an action initiating step for initiating the first action on the basis of the result from the judging step.

Also consistent with the present invention there is provided an image processing device whereby an image of a body moving from a first object towards a second object is displayed on display means, comprising: second object position calculating means for calculating a set period of time from the body starting movement from the first object until it reaches the second object, and calculating the position of the second object after the set period of time has elapsed, from the speed of the second object; speed calculating means for calculating the speed of the body from the calculations and the current position of the first object.

Also consistent with the present invention there is provided an image processing device whereby an image of a body moving from a first object towards a second object is displayed on display means, wherein the speed of the body is changed appropriately such that the period of time from the body starting movement from the first object until it reaches the second object is constant, regardless of the speed of the second object, and the positions of the second object and the first object.

Also consistent with the present invention there is provided an image processing device whereby an image of a body moving from a first object towards a second object is displayed on display means, comprising: second object position calculating means for calculating a set period of time from the body starting movement from the first object until it reaches the second object, and calculating the position of the second object after the set period of time has elapsed, from the speed of the second object; speed calculating means for calculating the speed of the body from the calculations and the current position of the first object.

Also consistent with the present invention there is provided a game device comprising game contents wherein players make a selection from specified options, the selection operation by the players being implemented by a combination of operations performed by a plurality of players, and an option that is disadvantageous to the players being selected if the players do not perform a selection operation, or do not perform a valid selection operation.

Also consistent with the present invention there is provided a data processing method in a game device comprising game contents wherein players make a selection from specified options, an option that is disadvantageous to the players being selected if the players do not perform a selection operation, or do not perform a valid selection operation.

Also consistent with the present invention there is provided a game device comprising points deducting means for deducting a specified number of points corresponding to points deduction events occurring during a game, and points deduction display means for providing specified displays on the basis of the points deduction status, wherein the points deducting means deducts a smaller number of points than the specified number of points, in cases where the end of the game is imminent, due to shortage of points.

Also consistent with the present invention there is provided a game device comprising points deducting means for deducting a specified number of points corresponding to points deduction events occurring during a game, and points deduction display means for providing specified displays on the basis of the points deduction status, wherein, in cases where it will be unable to continue the game if the specified number of points are deducted on the basis of a points deduction event occurring in a state where the remaining points score is higher than the minimum points level required to continue playing the game, the points deducting means deducts points up to the minimum points level required to continue playing.

Also consistent with the present invention, the points deducting means displays pictures corresponding to the players' current points score.

Also consistent with the present invention there is provided a data processing method in a game device comprising points deduction display means for providing specified displays on the basis of the points deduction status in a game, wherein specified numbers of points to be deducted are determined respectively for points deduction events, but if the end of the game is imminent, a number of points smaller than the specified number of points to be deducted, corresponding to a points deduction event occurring during the game, are deducted.

Also consistent with the present invention there is provided a storage medium, which is a medium which stores information (principally digital data and programs) by physical means of some kind, and enables specified functions to be implemented in a processing device, such as a computer, special processor, or the like. Any medium may be used, provided that programs can be downloaded into a computer, by means of some kind, and specified functions can be implemented in the computer. Examples of such a medium include: a flexible disk, fixed disk, magnetic tape, magneto-optical disk, CD, CD-ROM, CD-R, DVD-RAM, DVD-ROM, DVD-R, PD, MD, DCC, ROM cartridge, RAM memory cartridge with battery back-up, flash memory cartridge, non-volatile RAM cartridge, and the like. Moreover, it also includes cases where data is transferred from a host computer via a wired or wireless communications circuit (public circuit, data line, satellite circuit, etc.). The Internet is also included in this description of a storage medium.

BRIEF DESCRIPTION OF THE DRAWINGS

FIG. 1 is a left-hand side view of the external composition of a truck game, which is a game device according to a first embodiment of the present invention;

FIG. 2 is a right-hand side view of the aforementioned game device;

FIG. 3 is a front view of an input device of the aforementioned game device;

FIG. 4 is a front view of a display device of the aforementioned game device;

FIG. 5 is a rear view of an input device of the aforementioned game device;

FIG. 6 is a rear view of a display device of the aforementioned game device;

FIG. 7 is a plan view of the aforementioned game device;

FIG. 8 is an under view of the aforementioned game device;

FIG. 9 is a partial enlargement of a plan view showing the mechanical composition of an input device of the aforementioned game device;

FIG. 10 is a right-hand side view illustrating the operating method and mechanical composition of an input device of the aforementioned game device;

FIG. 11 is an enlargement of a handle section from an input device of the aforementioned game device;

FIG. 12 is a block diagram showing the basic composition of a control device for the aforementioned game device or an image processing device according to the first embodiment of the invention;

FIG. 13 is a flowchart whereby the aforementioned game device implements a jump operation;

FIG. 20 is a flowchart showing a procedure whereby the aforementioned game device implements subsequent jump processing;

FIG. 21 is a left-hand side view showing a truck moving along rails on a land surface having an indentation therein;

FIG. 22 is a flowchart whereby the aforementioned game device implements obstacle acceleration processing;

FIG. 23 is a flowchart whereby the aforementioned image processing device implements timing adjustment processing;

FIG. 24 is a flowchart for implementing difficulty level adjustment processing;

FIG. 25 is a diagram illustrating the operation implemented by the aforementioned game device when a truck performs a course selection operation;

FIG. 26 is a flowchart whereby the aforementioned game device implements course selection processing; and FIG. 27 is a flowchart whereby the aforementioned game device implements points reduction display processing.

DESCRIPTION OF THE PREFERRED EMBODIMENT

Figure 14:
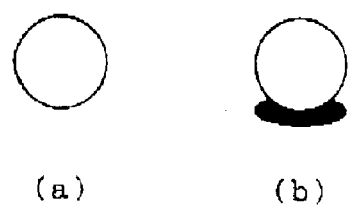
FIG. 14 shows oblique views of an object approaching a plane in a virtual space: (a) shows a case where no object shadow is displayed and (b) shows a case where a shadow of the object as formed on the plane is displayed.

Below, an embodiment of the present invention is described with reference to the drawings.

Summary of Game Device

FIG. 1 is a left-hand side view of the external composition of a truck game, which is a game device according to a first embodiment of the present invention; FIG. 2 is a right-hand side view of the aforementioned game device; FIG. 3 is a front view of an input device of the aforementioned game device; FIG. 4 is a front view of a display device of the aforementioned game device; FIG. 5 is a rear view of an input device of the aforementioned game device; FIG. 6 is a rear view of a display device of the aforementioned game device; FIG. 7 is a plan view of the aforementioned game device; FIG. 8 is an under view of the aforementioned game device; FIG. 9 is a partial enlargement of a plan view showing the mechanical composition of an input device of the aforementioned game device; FIG. 10 is a right-hand side view illustrating the operating method and mechanical composition of an input device of the aforementioned game device; and FIG. 11 is an enlargement of a handle section from an input device of the aforementioned game device. As shown in FIG. 1, the game device 1 according to the present invention comprises a main unit 2 and a playing platform 3. A processing device comprising a central processing unit, and the like, for carrying out game processing is installed in the main unit 2. The main unit 2 also comprises a screen display section 23 forming display means 13 for displaying the state of the game, this screen display section 23 being in an upright position inclined towards the rear when viewed from the front face of the game device. The playing platform 3 is provided with input devices, described hereinafter, which can be mounted by two players. The main unit 2 and playing platform 3 are electrically connected by a cord, in such a manner that input signals from the input devices are transmitted to the main unit 2.

The playing platform is also provided with two handles 31 which are mutually coupled and operated respectively by the players' hands, and two pedals 32, which are operated respectively by the players' feet. The handles 31 are respectively supported by a support section 311 at one end thereof, and are formed into a T-shaped handle 313 forming the operating section of the handle at the other end thereof. Motive force transmitting means 315 is supported by an axle between the support section 311 and the operating section 313, thereby transmitting motive force generated by operation of the handle 31 to other sections of the game device.

The pedals 32 have a rectangular plate shape and are designed in such a manner that a switch is turned on when the player presses down on the pedal with one foot.

Summary of Game

Next, an outline or a game played by two players using this game device 1 is described. When a player inserts a coin, in coin slot 50, and enters a specified command for starting the game, a game screen is displayed on the screen display section 23 of the game device main unit 2 and the game starts. The game screen shows a two-dimensional projection of a scene wherein two parallel rails are laid on a land surface (or in the air, on a water surface or in water) provided in a virtual three-dimensional space, and a four-wheeled truck (players' truck) driven by characters representing the players (players' characters) is running along these rails.

On the rails in the forward direction of travel of the players' truck, a character representing an enemy of the players (enemy character), who is holding a jewel, is fleeing in a similar truck (enemy truck). The enemy character implements a variety of attacks on the players' characters, but if, under the control of the players, the players' characters evade these attacks and are able to catch up with the enemy truck and take possession of the jewel, then they can win the game. If the players' characters are not able completely to avoid the attacks of the enemy and if they collide with various obstacles, then they will gradually lose points and the players' truck will gradually break apart, and when the players' truck is finally destroyed, the remaining points total will become zero and the game will end.

If a player moves the handle 31 upwards and downwards, imparting a paddling action to the truck, then the players' truck is able to catch up with the enemy truck, and is also able to avoid obstacles, such as sharks, or the like, approaching from behind. If the handle 31 is moved upwards and downwards quickly, then the speed of the players' truck can be quickened accordingly. Moreover, if the track is going up an incline, or if a shark has taken hold of the rear end of the truck, then the handles 31 become heavier to operate.

When a player steps on the pedal 32, if only one of the two players has stepped on the pedal, then the wheels on the side of the players' truck where the pedal 32 has been pressed lift up. Here, the lifted state of the wheels is maintained for as long as the pedal 32 continues to be pressed. Thereby, if there is an obstacle lying on one of the rails, for example, then that obstacle can be avoided by causing the wheels to lift up whilst the truck is passing that point. When the input to the pedal 32 is cancelled, the raised wheel returns to the original rail. In a situation where the two players press on the pedals 32 simultaneously, the truck jumps upwards in the virtual space, to a specified height. Obstacles can be avoided by means of this method. After the truck has jumped, the truck falls according to a specified force of gravity and lands back on the rails again.

Structure of Game Device (1) (2)

As FIG. 10 shows, the left and right-side handles 31 are connected respectively via motive force transmitting means 315 to left and right-side cranks 33, which are designed in such a manner that they can be rotated in the same direction by moving the handles 31 up and down. The left and right-side cranks 33 can be rotated (together with crank shafts 36) respectively about the same axis as left and right-side clutches 34, and left and right-side principal gears 35, the cranks 33 and principal gears 35 being engageable and disengageable by means of the clutches 34, 34. The left and right-side principal gears 35 engage respectively with left and right-side small gears 38, 38 fixed onto an idle shaft 37. A large pulley 39 is fixed to the idle shaft 37 coaxially with the small gears 38, in such a manner that it rotates at the same speed as the small gears 38. Moreover, the large pulley 39 is connected via a belt to a small pulley 40, and the rotating shaft of this small pulley 40 is connected to a rotational speed sensor and brake, which are not illustrated in the diagram.

As shown in FIG. 1, a microswitch 52 for engaging and disengaging the clutches and levers 316 for operating this microswitch 52 are provided in the operating section of each handle 31. When a player takes hold of the operating section of the handle 31 together with a lever 316, the microswitch turns on, and clutch 34 on the side that is being held engages. When the player releases the handle 31, the lever 316 returns to its original position, the microswitch 52 turns off, and the clutch 34 disengages.

Next, the action of this handle mechanism will be described. In a case where the two handles 31 and levers 316 are held by players, such that both the left and right-side clutches 34 are connected, the rotational force applied to the right-side crank 33 will be transmitted via the right-side clutch 34, right-side principal gear 35 and right-side small gear 38, to the idle shaft 37. The rotation of the idle shaft 37 is then transmitted via the principal pulley 39 and the belt to the small pulley 40, and moreover, it is also transmitted via the left-side small gear 38, left-side principal gear 35, and left-side clutch 34, to the left-side crank 33.

Furthermore, if, for example, the left-side clutch 34 is disconnected and only the right-side handle 31 is driven, then only the right-side crank 33, right and left-side principal gears 35 and small gears 38, the large pulley 39 and the small pulley 40 will rotate, whilst the left-side crank shaft 36 will not rotate. In particular, in this embodiment, by fixing the crank shaft 36 on the side where the clutch 34 is disengaged (in this case, the left-hand side), the left-side handle 31 is fixed and cannot be operated.

The handles 31 are able to swing upwards and downwards about a support section 311, and this swinging movement is converted into rotation of the cranks 33. The motive force transmitting means 315 are supported at the lower end thereof by the cranks 33, and at the upper end thereof by the handles 31. The range of the swinging movement of the handles 31 is restricted by the diameter of the cranks 33.

This game device is modeled on a two-passenger truck, as displayed on the screen display section 23, and by providing two handles 31 aligned in the same direction, it is possible for two players to operate the handles 31 in positions facing in the same direction towards the screen display section 23, thereby making the screen display section 23 readily visible to the players.

The supporting sections for the handles 31 are set in a low position, and consequently, the operating sections of the handles 31 move back and forth about a central position which is higher than the supporting sections. Furthermore, the screen display section 23 is inclined in the opposite direction to the operating sections. Therefore, the screen display section 23 can be seen readily by the two players. When this game device is used as a one-player game device, the player selects any one of the two handles 31, and when he or she operates this handle, the truck moves through the virtual space under the drive of that handle alone. In this case, the handle that is not being used by the player is not coupled to the handle in use, since the clutch 34 is disengaged, and moreover, a brake (not illustrated) is applied to that handle in such a manner that it cannot be moved.

In this embodiment, an electronic game device modeled on a truck driven by operating handles was used as an example of a multiple-player game device having a plurality of input mechanisms which are mutually coupled, but the present invention is not limited to this, and can be applied to a wide range of game devices, for example, game devices modeled on a multiple-passenger vehicle which is driven by a plurality of people pressing on pedals, or game devices modeled on a boat or canoe driven by a plurality of people operating oars or paddles.

Internal Composition

FIG. 12 is a block diagram showing the basic composition of a control device for a game device according to the present embodiment. The game device in the present embodiment comprises a game device control section 10, input device 11, output device 12, display means 13, and speaker 14. The input device 11 comprises a handle, jump pedal and clutch lever, as described above, and it may also have a viewpoint change switch (not illustrated in the diagram). The output device comprises a brake 120, clutch 121 and various lamps 122. The display means 13 consists of an image display device, such as a video monitor, projector, or the like. The game device control section 10 comprises a CPU (central processor unit) 101, as well as a ROM 102, RAM 103, sound device 104, input/output interface 106, scroll data computing device 107, co-processor (auxiliary calculating device) 108, terrain data ROM 109, geometrizer 110, shape data ROM 111, drawing device 112, texture data ROM 113, texture map RAM 114, frame buffer 115, image synthesizer 116, and D/A converter 117.

The CPU 101 is connected via a bus line to the ROM 102, which stores specified programs, and the like, the RAM 103, which stores data, the sound device 104, input/output interface 106, scroll data computing device 107, co-processor 108, and geometrizer 110. The RAM 103 functions as a buffer, and is used for writing various commands (display object, and the like) to the geometrizer 110, and writing matrices when calculating conversion matrices, and the like. The input/output interface 106 is connected to the aforementioned input device 11 and output device 12, whereby operating signals from the handle, or the like, forming the input device 11 are input to the CPU 101 as digital quantities, and signals generated by the CPU 101 and the like can be output to the output device 12. These signals include various flag signals.

The sound device 104 is connected via a power amplifier 105 to a speaker 14, and a sound signal generated by the sound device 104 is power amplified and then supplied to the speaker 14 forming the sound output device.

In the present embodiment, the CPU 101 is devised in such a manner that, on the basis of a program stored in the ROM 102, it reads in operating signals from the input device 11 and terrain data from the terrain data ROM 109 or shape data from the shape data ROM 111 (comprising three-dimensional data for "objects, such as player's vehicle, enemy vehicle, etc." or "background, such as path of travel, terrain, sky, structures, etc."), and performs behavioral calculations (simulations) for the truck, such as judging impacts (collisions) between the terrain and the truck, judging impacts between obstacles and the truck, and the like.

This calculation of the truck's behaviour simulates the movement of the truck in a virtual space in accordance with the operating signals input by the players via the input device 11, and after the co-ordinate values in the three-dimensional space have been determined, a conversion matrix for converting these co-ordinate values to a viewpoint co-ordinates system is supplied to the geometrizer 110, along with shape data (for the truck, terrain, and the like). The terrain data ROM 109 is connected to the co-processor 108 and therefore previously determined terrain data is transferred to the co-processor 108 (and the CPU 101). The co-processor 108 principally serves to judge impacts between the terrain and the truck, and it mainly undertakes floating-point calculations during this judgment process and the truck behavior calculations. Consequently, since impact (collision) judgement relating to the truck and terrain is carried out by the co-processor 108, the judgment results therefrom being supplied to the CPU 101, the calculational load on the CPU is reduced and the aforementioned impact judgment processing can be carried out more quickly. The geometrizer 110 is connected to the shape data ROM 111 and the drawing device 112. Polygon shape data (three-dimensional data for trucks, terrain, background, and the like, comprising each vertex thereof) is previously stored in the shape data ROM 111, and this shape data is transferred to the geometrizer 110. The geometrizer 110 performs a perspective conversion of the specified shape data by means of a conversion matrix supplied by the CPU 101, thereby yielding data converted from a three-dimensional virtual space co-ordinates system to a viewpoint co-ordinates system.

The drawing device 112 applies texture to the converted viewpoint coordinates system shape data, and outputs the resulting data to the frame buffer 115. In order to apply texture to the data, the drawing device 112 is connected both to the texture data ROM 113 and texture map RAM 114, and to the frame buffer 115. Polygon data refers to relative or absolute co-ordinate data groups for each vertex of a polygon consisting of a plurality of vertices (principally, a three or four-sided shape). The aforementioned terrain data ROM 109 stores polygon data defined in relatively coarse terms, which is sufficient for carrying out impact judgments for the truck and terrain. The shape data ROM 111, on the other hand, stores polygon data which is set in more precise terms and relates to the shapes constituting the screen images of the truck, background, and the like. The scroll data computing device 107 computes data for scrolling screens, such as text, or the like, and this computing device 107 and the aforementioned frame buffer 115 are connected, via the image synthesizer 116 and the D/A converter 117, to the display device 13. Thereby, the polygon screen images (simulation results) of the truck, terrain (background), and the like, stored temporarily in the frame buffer 115 are synthesized with scrolling screen images of text information, such as speed, danger warnings, and the like, according to a specified priority, thereby generating final frame image data. By converting this image data to an analogue signal at the DIA converter 117 and transferring to the display device 13, game images are displayed in real time.

Jump Processing (3)

Next, the processing implemented inside the computer of this game device will be described. As stated above, when a player operates the handle 31 the corresponding input data is read in by the control section 10, and a view of the players' truck running along the rails is displayed on the display means 13. If the speed of the handle 31 operation increases, then the speed of the truck also increases and if the handle 31 slows down, the truck also slows down.

A flowchart for implementing a jump operation when a player presses on a jump pedal is illustrated in FIG. 13. Firstly, if the control section 10 has judged that a jump pedal input has been made by a player (step S301), then it also determines whether or not both the left and the right-side pedals have been pressed respectively by the two players, at the same time (step S302). If the left and right-side pedals have both been pressed simultaneously, then processing is implemented whereby a view of the truck jumping directly in the air, without leaning to one side, is displayed on the display means, the truck landing again after a fixed period of time (step S303).

On the other hand, if only one pedal has been pressed, then the control section 10 displays on the display means 13 a view wherein the truck leans to one side and only the wheels on the side where the pedal has been pressed are raised in the air (step S304). Here, if the control section 10 has judged that there has been an input to the other pedal, before the input to the pedal already pressed has ceased (step S305), then processing is implemented whereby a view of the truck jumping in the air whilst leaning to one side is displayed on the display means, the truck landing again after a fixed period of time (step S306).

If the other pedal is not pressed, then the inclined state of the vehicle at step S304 is maintained as long as the input to the previously pressed pedal is maintained, and when the control section 10 has judged that the input to the previously pressed pedal has ceased (step S307), then processing is implemented whereby the raised wheels drop down and the truck returns to a parallel course (step S308), this image being displayed on the display means 13.

In order to carry out this processing, it is necessary, for instance, for the two players both to press on the jump pedals when they want to make the truck jump in the air. Moreover, if it is necessary to lift up the wheels on only one side of the vehicle, for example, in course selection processing as described below, then after the wheels which are to be on the ground have landed (after the player on the side of the grounded wheels has released the jump pedal), the other player must press the jump pedal for the wheels which are to be lifted in the air.

Therefore, since a single operation is carried out by means of a combination of actions implemented by more than one person, there exist operations which cannot be performed by the actions of one player alone, and therefore the game device requires co-operation and teamwork in the players.

Shadow Formation Processing (4)

In this game device, the truck may jump above the surface of the ground (or water), and as illustrated in FIG. 14, if the shadow of the truck is formed on the land surface (FIG. 14(b)), it is easier to comprehend the positional relationship between the truck and the land surface (whether or not the truck is touching the ground or raised in the air) compared to a case where no such shadow is formed (FIG. 14(a)).

Figure 15:
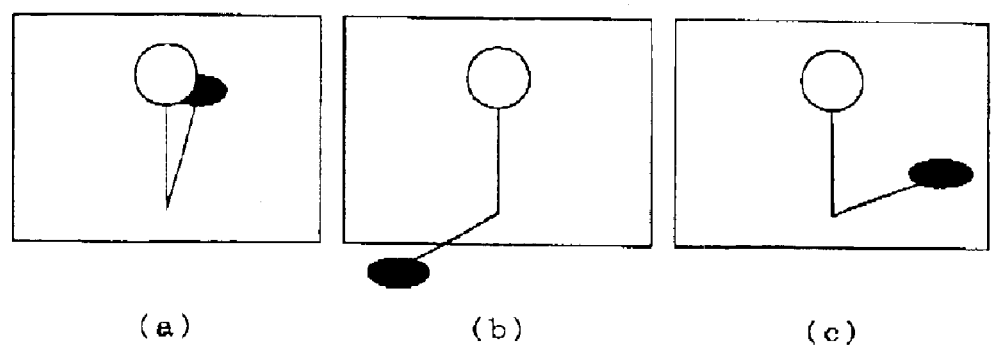
FIG. 15 shows oblique views of the shadow of an object formed on a plane in a virtual space: (a) shows a case where a light source is provided on the viewpoint side of the object; (b) shows a case where a light source is provided on the opposite side of the object as observed from the viewpoint; and (c) shows a case where a light source is provided to one side of the object.

Furthermore, if the shadow is formed on the far side of the object as observed from the viewpoint (if the light source is provided on the viewpoint side of the object), then when observed from the viewpoint, the movement of the object and the movement of the shadow will appear to be the same movement, and hence the positional relationship between the object and the land surface will become difficult to understand (see FIG. 15(a)). Also, if the shadow is formed on the viewpoint side of the object (if the light source is provided on the far side of the object as observed from the viewpoint), then when the object is displayed in the front portion of the screen, the shadow may fall outside the screen area, and hence the positional relationship between the object and the land surface will become difficult to comprehend (see FIG. 15(b)).

Figure 17:
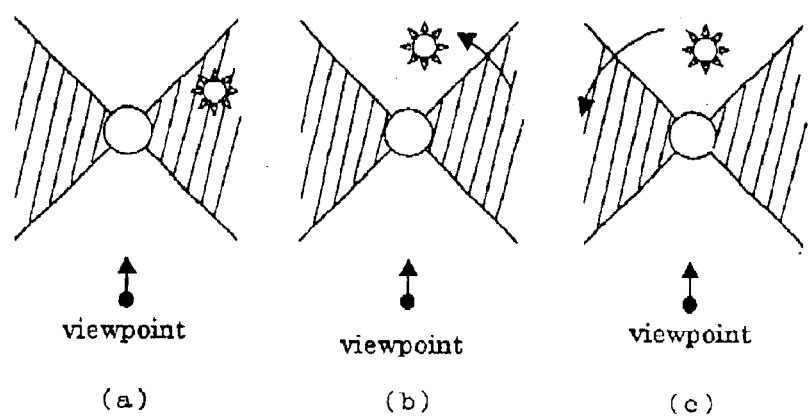
FIG. 17 is a plan view showing the position of a light source when the image processing device according to the first embodiment of the present invention implements shadow formation processing: (a) shows the range within which the light source should be positioned; (b) shows a case where the light source is outside this range; and (c) illustrates a method for moving the light source in a case where the light source is outside this range.

Therefore, the shadow is formed within a region extending, from a vertical line between the truck and the land surface, in a horizontal direction (FIG. 15(c)) as observed from the viewpoint of between 45 degrees to the right front and 45 degrees to the right rear, or 45 degrees to the left front and 45 degrees to the left rear (hatched regions in FIG. 17(a)).

Figure 16:
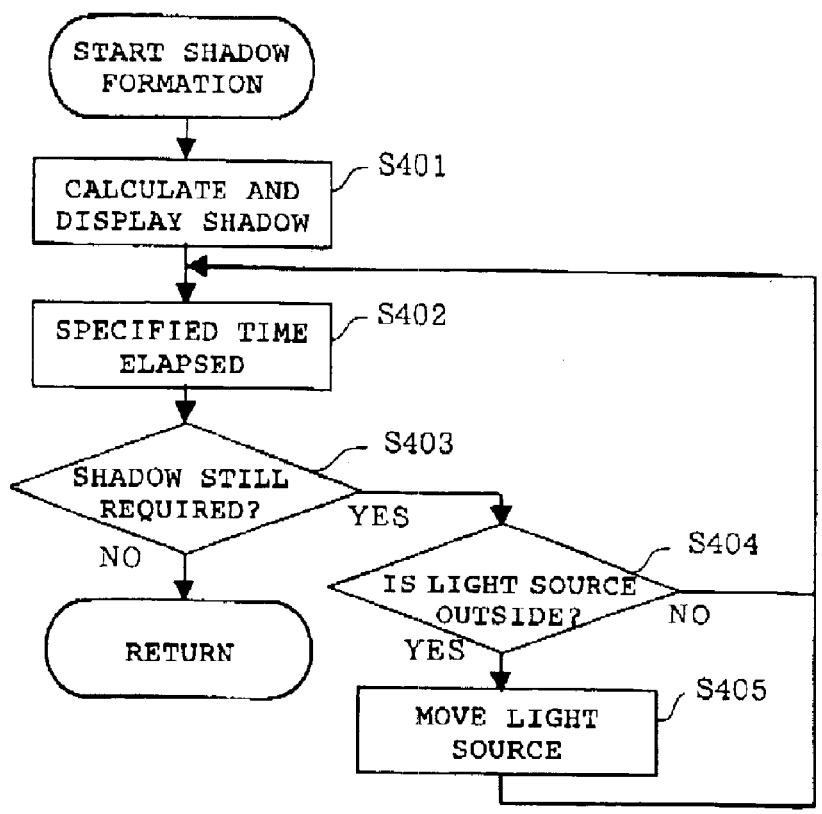
FIG. 16 is a flowchart whereby the aforementioned image processing device implements shadow formation processing by shadow forming means.

FIG. 16 shows a flowchart for implementing shadow formation processing using shadow forming means. The players' truck is located in the front portion of the virtual space (close to the viewpoint) displayed on the screen, and it is progressing towards the rear of the screen (away from the viewpoint) along rails laid on a land surface. If a shadow is formed within a region between 45 degrees to the front right and 45 degrees to the rear right, or 45 degrees to the front left and 45 degrees to the rear left, then shadow forming means sets the light source (parallel light source) in a position above the truck, and within a region extending from a vertical line between the truck and the land surface in a horizontal direction as observed from the viewpoint, in other words, between 45 degrees to the rear left and 45 degrees to the front left or 45 degrees to the front right and 45 degrees to the rear right. The control unit 10 calculates a shadow image on the basis of the position of the light source and causes this shadow image to be displayed on the display means (step S401).

After setting the position of the light source, when a fixed period of time has elapsed (step S402), the control section 10 judges whether or not it is still necessary to display a shadow (step S403). If the display itself is terminated, because the game ends, or if there are dark areas on the course and the truck passes through one of these areas, then the control section 10 determines that no shadow display is required, and it skips the corresponding routine. If it is necessary to display a shadow, then the control section 10 checks whether or not the light source has moved outside the aforementioned restricted range (step S404). If it is within the aforementioned restricted range, then the control unit 10 returns to step S402, and waits for a fixed time period to elapse.

If the light source has deviated outside the aforementioned restricted range (FIG. 17(b)), then the position of the light source is moved until it is in a position inside the restricted range (step S405). Here, if, for example, the course taken the truck bends to the right without the light source provided in the virtual space having moved, then from a viewpoint positioned to the rear of the truck, the light source will appear to have moved in a leftward direction. If this causes the light source to move outside the restricted range, then it may be possible to restore the position of the light source by moving it to the right, but by so doing, the direction of movement of the shadow will alter course suddenly and may produce an unnatural effect. Therefore, in the present embodiment, the position of the light source is brought within the restricted range by moving the light source further to the left (FIG. 17(c)).

Figure 18:
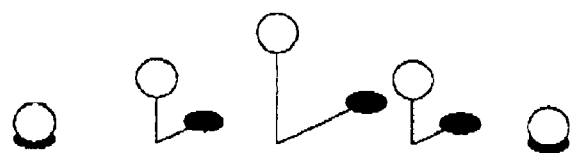
FIG. 18 is an oblique view showing a sequence of images displayed when an object is made to jump vertically with respect to a plane, in a case where a light source is placed in a position similar to that illustrated in FIG. 15(c)

If a parallel light source is provided in such a position and a scene is displayed wherein an object jumps up vertically from a flat land surface and then lands again, the object and shadow will respectively perform reciprocal movements in a linear path, and a viewer will be able readily to perceive the position at which the object and shadow meet (in other words, the position where the object lands) (see FIG. 18). Consequently, it becomes easy to perceive the timing at which the object lands, thereby making it possible to provide an image processing device whereby such information is readily understood by the viewer when applied in a game device where an object must land before it can make a subsequent jump.

Subsequent Jump Processing (5)

Figure 19:
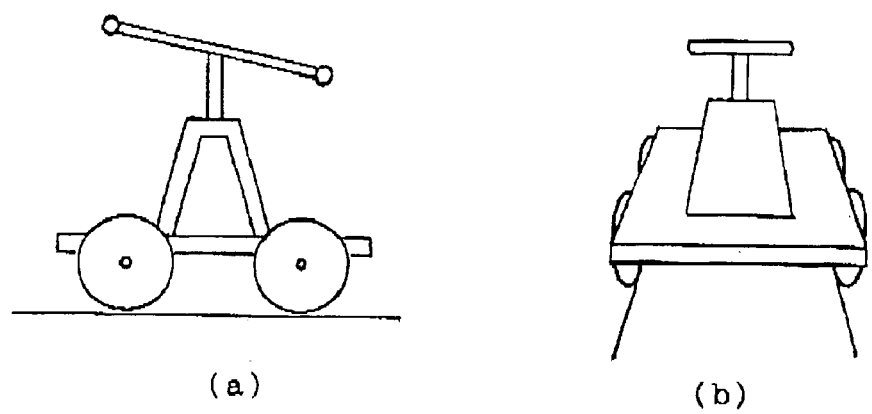
FIG. 19 is a diagram showing cases where a truck is in contact with the ground, and where a truck is near the ground but not in contact with the ground, in the aforementioned game device: (a) shows a case where the viewpoint is located close to the land surface and (b) shows a case where the viewpoint is located above and to the rear of the truck.

In this embodiment, once the truck has jumped it is not able to jump again until it has landed. However, whilst it is easy to tell if the object is in contact with the ground when the viewpoint is at almost the same height as the land surface (FIG. 19(a)), it is not possible to see the point of contact between the object and the land surface when the viewpoint is positioned above the object, and therefore it becomes difficult for the player to perceive accurately whether or not the object has landed (FIG. 19(b)). Therefore, a jump input is permitted even when the truck has not landed completely, provided that it is at or below a fixed height. FIG. 20 is a flowchart showing a procedure for implementing subsequent jump processing after the truck has jumped. In order to perform a subsequent jump, it is necessary for the truck to land first on the land surface, but in this embodiment, a certain tolerance is allowed in this respect, since it is not possible to perceive the positional relationship between the truck and the land surface precisely.

If the processing means recognizes that the two players have pressed on their respective jump pedals simultaneously (step S501), then the processing device determines whether or not the truck is in contact with the land surface, or whether or not the height of the truck from the land surface is within a previously specified jump input tolerance range (step S502).

If, as a result of this judgement process, the distance from the truck to the land surface is too large, then the jump input is ignored (step S503), and jump processing is not carried out until a further jump input is made. If, on the other hand, the distance between the truck and the land surface is within the jump input tolerance range, even if it is not actually completely in contact with the ground, then jump processing is carried out (step S504).

By means of this processing, a jump input can be accepted even in cases where the truck bounces to some extent, due to indentations in the land surface (or rails) (see FIG. 21). Since the players may sometimes be unable to perceive that the truck is bouncing, this processing makes it possible to eliminate stress on the players, in a similar manner to the subsequent jump processing.

Obstacle Acceleration Processing (6)

In cases where the truck is presented with an obstacle, if the obstacle moves suddenly towards the truck from a position in front of the truck, then since the relative speed thereof is high, the obstacle can be avoided if the truck is made to jump, or the like, with good timing. However, if, for example, an obstacle approaches the truck suddenly from behind, then the relative speed between the truck and the obstacle will be low, and since the time period for which the truck can be withdrawn into the air by jumping is limited, it is not possible to avoid the obstacle, even if the truck is made to jump with good timing. Also, if an obstacle is large and therefore takes a long time to pass, it will also be impossible to avoid the obstacle. Therefore, in the present embodiment, obstacles can be avoided by causing the obstacles to accelerate during the time that the truck and obstacles pass each other.

FIG. 22 shows a flowchart for implementing this obstacle acceleration processing. Firstly, when the player implements a jump operation (step S601), it is judged whether or not there exists an obstacle which the truck cannot avoid making contact with before it lands after the current jump operation, on the basis of the relative speed of the truck and obstacle, the size of the obstacle, and the distance between the truck and obstacle (step S602).

If there is an obstacle that cannot be avoided, then it is determined whether or not a collision with the truck can be avoided by accelerating the obstacle in question to a fixed speed (step S603). The degree to which the obstacle is accelerated is set at the least to a level whereby the obstacle can be avoided if the timing of the jump is good, but it may also be set to a larger acceleration, depending on the level of difficulty of the game.

If it is judged that a collision cannot be avoided even if the obstacle is accelerated, then it is determined that the jump timing was poor, and this processing is exited without accelerating the obstacle. If it is judged that a collision can be avoided by accelerating the obstacle, then processing for accelerating the obstacle is carried out (step S604).

Timing Adjustment Processing (7)

In the truck game device according to the present embodiment, a situation may arise where enemy characters cut down a tree standing close to the rails such that it forms an obstacle to the truck of the players' characters. In this case, a fixed period of time is required from the enemy character raising an axe (first action) until the axe falls (second action), whilst the distance that the enemy character can advance within that time, depends on the speed of the character. Therefore, a problem arises of which position the enemy character should raise the axe so that it reaches a specified position (position where the tree is standing) when it falls.

FIG. 23 shows a flowchart for the implementation of timing adjustment processing by an image processing device applied to a game device according to the present embodiment. Firstly, a fixed time period for the enemy character to perform the necessary actions, in other words, the period of time required from the enemy character raising the axe (first action) until the axe falls (second action) is read in from previously specified data, and this value is taken as T (step S701).

Next, the time period required for the enemy character to move from its current position to a position where it can carry out the second action (position where a tree is standing by the side of the rails) is determined from (distance from enemy character to tree by side of rails)÷(current speed of enemy character), and this value is taken as T2 (step S702). This value T2 is then compared with the value of T (step S703), and if the value of T2 is greater than T, the value of T2 is recalculated, whilst if the value of T2 is less than T, (step S703), then the operation starts (step S704).

By this means, it is possible to display the necessary actions at suitable timings, regardless of the speed of the enemy character.

Difficulty Level Adjustment Processing (8)

In the image processing device applied to a game device according to the present embodiment, an enemy character may throw obstacles at the players' characters. In this case, the period of time taken for the obstacle to reach the position of the players' characters after it has been thrown by the enemy character has a significant effect on the level of difficulty of the game. If the image processing device adjusts the speed of the players' characters, or the distance between the enemy character and the players' characters, in order to match this time period to the level of difficulty of the game, then an unnatural image will result. Therefore, in this case, processing for adjusting the speed of the thrown obstacle is carried out. FIG. 24 shows a flowchart illustrating how difficulty level adjustment processing is carried out by an image processing device applied to a game device according to this embodiment. If a flag indicating that the enemy character is attacking the players' characters has been set (step S801), then the control section 10 calculates the position P that the players' characters will reach after a fixed time period has elapsed, on the basis of the current position and speed of the players' characters (step S802). Here, the "fixed time period" is a value set according to the level of difficulty of the game, and if the difficulty level is high, for example, then a short time period is set. Furthermore, the calculation is carried out on the assumption that the speed of the players' characters does not change during that time period.

Subsequently, the control section 10 calculates the speed SP required for the obstacle launched by the enemy character to reach the position P after the aforementioned time period, on the basis of position P and the current position of the enemy character (step S803). The obstacle is then launched by the enemy character towards position P at this calculated speed SP (Step S804).

In this process, it is assumed that the speed of the players' characters does not change, and therefore if the speed of the players' characters does change after the obstacle has been launched, then the period of time taken by the obstacle to reach the players' characters will be different from the specified time period described above. However, since the time period from the launch of the obstacle until it reaches the players' characters is short, for instance, approximately 0.5 seconds, the acceleration made during this period will not be large enough to have a notable effect on the level of difficulty of the game.

Course Selection Processing (9)

In the present embodiment, the rails along which the truck is running may branch in places (see FIG. 25(a)), and if the wrong course is selected, the players may encounter unavoidable obstacles on the course and lose points. As illustrated in FIG. 25(b), in this case, players select a course by making the wheels on the same side as the course they want to follow remain on the rails, whilst causing the wheels on the opposite side to this course to lift up in the air. This operation is performed by a combination of actions implemented by two players, as described previously. In the present embodiment, the processing load on the game device is reduced by implementing processing whereby the truck travels along the course on the opposite side to the correct course in cases where the players do not perform any course selection operation, or in cases where they have performed an invalid operation for course selection.

FIG. 26 is a flowchart for implementing this course selection processing. Firstly, when the control section 10 judges that the players' truck has reached a course junction point (step S901) it reads in input information from the pedals as the truck passes the junction point (step S902). It then determines whether or not the combination of pedal operations is correct (step S903), and if it judges that a correct operation has been performed, it implements processing whereby the truck in which the players' characters are riding proceeds along the correct course (step S904).

If, on the other hand, a correction operation has not been input, in other words, firstly, if the wrong course has been selected, or secondly, if no course selection operation has been performed (in the present embodiment, if both right and left-side wheels are in contact with the rails when the truck passes the junction point,) or thirdly, if no valid course selection is made (in the present embodiment, if the truck is in the air (jumping) when it passes the junction point,) then of the two courses at the junction, the incorrect course will be selected.

Thereby, it is possible to reduce the players' number of points by means of a predetermined program of a minimum size, without needing to implement processing for "derailments", or the like, and without having to carry out new image processing operations, for depicting, for instance, a jumping truck crashing into a tree standing between the two routes at the junction point, and hence, the processing load on the control section 10 is reduced and memory space in the ROM is saved. Moreover, since this game essentially involves two players working together in order to overcome adverse situations, it certainly does not detract from the appeal of the game if the truck is made to follow a course which inevitably causes the players to lose points if they do not act co-operatively.

Points Reduction Display Processing (10)

In this embodiment, if the players' characters suffer damage from the attacks of enemy characters or due to other obstacles, this is represented pictorially by depicting the truck gradually falling apart. Here, the type of damage corresponds to a number of points lost, and the remaining number of points after these points have been deducted corresponds to a picture of the truck at one stage in its gradual destruction. If the truck is completely destroyed, then the game ends, but before game over processing, a picture of the truck in a "verge of death" state is always depicted as a special image display indicating that the game is about to end imminently.

FIG. 27 shows a flowchart for implementing point reduction display processing of this kind. If the control unit 10 identifies that the players' characters have suffered damage (step S101), then it determines whether or not the aforementioned special image display has already been performed (step S102). Here, the special image display serves to indicate that the players now have the minimum number of points remaining required to continue playing the game (for instance, 1 point), and that if they lose any further points, the game will end. Therefore, if any points are lost by damage received at step S101, the game will end immediately and consequently, the control section 10 will carry out game over processing (step S103).

If the special image display has not yet been performed, then the control section 10 determines from the players' current points score as recorded in the RAM, or the like, whether or not the players' points score will reach the minimum level for continuing the game (1 point) or lower when points corresponding to the type of damage suffered have been deducted (step S104). If the points score will fall to or below the minimum level, then the control section 10 reduces the players' points score to 1 point. By using this points deduction operation, it is possible to prevent the game from bypassing the state where there is only 1 point remaining (special display state) and moving directly to game over processing, regardless of the type of damage suffered. If the players' points score has been reduced to 1 point by the points deduction operation, then the special display image is output to the display means (step S106). If the players' points score after this points deduction is greater than 1 point, then a display corresponding to the points score is output to the display means (step S107). In this way, by informing the players that the game is about to end, it is possible to advise the players to exercise caution, creating a feeling of tension in the players, who know that the game will end if they suffer any more damage.

What is claimed is:

1. A multiple-player game device, comprising:
   judging means for judging whether one or more operations performed by a plurality of players via input mechanisms are performed at the same time; and
   processing means for implementing a single game processing sequence being different from a resulting processing sequence representing a summation of the one or more operations if the judging means judges that the one or more operations are performed at the same time, and for implementing another game processing sequence different from said single game processing sequence if the judging means judged that an operation by a single player is performed at a separate time from an operation by another player.

2. The multi-player game device according to claim 1, further comprising an image processing means wherein a first object simulating a first physical body and a second object simulating a second physical body are provided in a virtual three-dimensional space, and an image of the first object and the second object as observed from a specified viewpoint is displayed on a display means, wherein it is a condition for a certain input that a positional relationship between the first physical body and the second physical body is in a specified state, with regard to the characteristics of the first physical body and the second physical body, and when an operation for the certain input is made, the certain input is accepted also in cases where said positional relationship differs from said specified state within a certain range thereof.

3. The multi-player game device according to claim 2, wherein said first object is a land surface, said specified viewpoint is set in a position higher than said land surface, and the specified state of said positional relationship is a state where said second object is in contact with said land surface.

4. The multi-player game device according to claim 1, further comprising game contents wherein a first object is withdrawn for a fixed period of time by an operation implemented by any one of the plurality of players, in such a manner that the first object does not contact a second object, wherein the relative speed between the first object and second object is increased in specified cases, whilst the first object is withdrawn.

5. The multi-player game device according to claim 4, wherein said specified cases are cases where contact between said first object and said second object cannot be avoided unless said relative speed is increased.

6. The multi-player game device according to claim 4, wherein said specified cases are cases where said first object and said second object are traveling the same direction, or cases where said second object is larger than a further second object in said game.

7. The multi-player game device according to any one of claims 4 to 6, wherein said relative speed is increased only in cases where an input for making said withdrawal operation is performed at a suitable timing.

8. The multi-player game device according to claim 1, further comprising an image processing device wherein a first action, and a second action carried out when a first object and a second object are in a specified positional relationship, are displayed on display means, said first action being started in such a manner that said second action is started after a fixed time period from the start of the first action.

9. The multi-player game device according to claim 1, further comprising an image processing device wherein a first action, and a second action carried out when a first object and a second object are in a specified positional relationship, are displayed on display means, the image processing device comprising:
   setting means for setting a required time period from the start of the first action until the second action is performed;
   time period calculating means for calculating a calculated time period corresponding to a period of time taken for the first object and the second object to assume said specified positional relationship, on the basis of the relative speed between the first object and the second object, and the distance between the first object and the second object and wherein the judging means is capable of providing a result including whether or not the calculated time period is equal to the required time period; and
   action initiating means for initiating the first action on the basis of the result from said judging means.

10. The multi-player game device according to claim 1, further comprising an image processing device wherein an image of a body moving from a first object towards a second object is displayed on display means, the image processing device comprising:
   a second object position calculating means for calculating, based on a set period of time from said body starting movement from the first object until it reaches the second object and on a speed of the second object, the position of the second object after said set period of time has elapsed;
   a speed calculating means for calculating the speed of said body based on the set period of time, the calculated position of the second object, and a current position of the first object when the body is released from the first object; and an image generating means for generating an image of the body moving from the first object towards the second object according to the calculated speed of the body.

11. The multi-player game device according to claim 1, further comprising an image processing device wherein an image of a body moving from a first object towards a second object is displayed on display means, wherein a speed of said body is changed appropriately such that a period of time from said body starting movement from the first object until it reaches the second object is constant, regardless of a speed of the second object, and positions of the second object and the first object.

12. The multi-player game device according to claim 1, further comprising:

a display means for displaying an image of a body moving from a first object towards a second object on the display means;

means for calculating a second object position based on a set period of time from said body starting movement from the first object until it reaches the second object, and on a speed of the second object, a position of the second object after said set period of time has elapsed;

means for calculating the speed of said body based on the set period of time, the calculated position of the second object, and a current position of the first object when the body is released from the first object; and means for generating an image of the body moving from the first object towards the second object according to the calculating speed of the body.

13. The multi-player game device according to claim 1, further comprising game contents wherein the plurality of players make a selection from specified options, one of the specified options that is disadvantageous to the players being selected if the players do not perform a selection operation, or if the players do perform an invalid selection operation that does not correspond to any one of the specified options.

14. A data processing method for a game device, comprising:

judging whether operations performed by a plurality of players via input mechanisms are performed at the same time; and implementing a single processing sequence if the judging means judges that the operations are performed at the same time, and for implementing another game processing sequence different from said single game processing sequence if the judging means judges that an operation by a single player is performed at a separate time from an operation by another player.

15. The method according to claim 14, wherein a first object simulating a first physical body and a second object simulating a second physical body are provided in a virtual three-dimensional space, and an image of the first object and the second object as observed from a specified viewpoint is displayed on display means, wherein it is a condition for a certain input that a positional relationship between the first physical body and the second physical body is in a specified state, with regard to the characteristics of the first physical body and the second physical body, and when an operation for the certain input is made, the certain input is accepted also in cases where said positional relationship differs from said specified state within a certain range thereof.

16. The method according to claim 14, further comprising:

receiving a withdrawal input whereby a first object is withdrawn for a fixed period of time in such a manner that the first object does not contact a second object; and increasing the relative speed between the first object and the second object in specified cases, whilst the first object is withdrawn.

17. The method according to claim 14, further comprising:

displaying on a display means a first action, and a second action carried out when a first object and a second object are in a specified positional relationship;

setting a required time period from the start of the first action until the second action is performed;

calculating a calculated time period corresponding to a period of time taken for the first object and the second object to assume said specified positional relationship, on the basis of the relative speed between the first object and the second object, and the distance between the first object and the second object;

providing a result including whether or not the calculated time period is equal to the required time period; and initiating the first action on the basis of the result from said judging step.

18. The method according claim 14, further comprising making, by the plurality of players, a selection from specified options, a selection operation by the players being implemented by a combination of operations performed by the players, and one of the specified options that is disadvantageous to the players being selected if the players do not perform the selection operation, or if the players perform an invalid selection operation that does not correspond to any one of the specified options.

19. The method according to claim 14, further comprising:

deducting a specified number of points corresponding to points deduction events ocurring during a game using a point deducting means; and providing specified displays on a points deduction display means on the basis of the points deduction status, wherein said points deducting means deducts a smaller number of points than said specified number of points, in cases where the end of the game is imminent, due to shortage of points, the points deduction means deducting the smaller number of points only for a first occurrence of the end of the game being imminent.

* * * * *